(12) United States Patent
Ichikawa et al.

(10) Patent No.: US 7,522,347 B2
(45) Date of Patent: Apr. 21, 2009

(54) ZOOM OPTICAL SYSTEM AND ELECTRONIC IMAGING APPARATUS USING THE SAME

(75) Inventors: Keisuke Ichikawa, Hachioji (JP); Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 220 days.

(21) Appl. No.: 11/717,813

(22) Filed: Mar. 13, 2007

(65) Prior Publication Data
US 2008/0117523 A1   May 22, 2008

(30) Foreign Application Priority Data
Nov. 22, 2006  (JP)  ............... 2006-316194

(51) Int. Cl.
  *G02B 15/14*  (2006.01)
(52) U.S. Cl. ...................... 359/680; 359/686
(58) Field of Classification Search ......... 359/680–682, 359/686
See application file for complete search history.

(56) References Cited

U.S. PATENT DOCUMENTS 6,101,044 A * 8/2000 Ori et al. ................. 359/691
6,349,002 B1   2/2002 Shibayama et al.
2002/0008920 A1   1/2002 Mihara et al.
2002/0057502 A1   5/2002 Ishii et al.
2005/0128601 A1 * 6/2005 Minakata et al. ......... 359/680
2008/0117315 A1 * 5/2008 Ichikawa et al. ......... 348/240.3
2008/0117526 A1 * 5/2008 Ichikawa et al. ......... 359/686

FOREIGN PATENT DOCUMENTS

JP   11-211984   8/1999

* cited by examiner

*Primary Examiner*—Jordan M. Schwartz
(74) *Attorney, Agent, or Firm*—Kenyon & Kenyon LLP

(57) ABSTRACT

A zoom optical system comprises a lens group 1 having one negative lens component and a lens group 2 wherein a distance on the optical axis between the lens group 1 and the lens group 2 is changed for magnification purpose. The negative lens component consists of a cemented lens of positive lens and a negative lens, and when a straight line expressed by $\theta gFp = \alpha p \times vdp + \beta p$ ($\alpha p = -0.00163$) is set up in a rectangular coordinate system in which a horizontal axis is expressed by vdp and an vertical axis is expressed by $\theta gFp$, vdp and $\theta gFp$ of the positive lens are included in domains specified by the following conditions.

$0.6400 < \beta p < 0.9000$ $3 < vdp < 27$ here, $\theta gFp$ is a ratio of a partial dispersion $(ng-nF)/(nF-nC)$ of the positive lens $L_{AP}$; vdp is Abbe number $(nd-1)/(nF-nC)$ of the positive lens $L_{AP}$; nd, nC, nF, and ng are refractive indices of d,C,F and g line, respectively.

20 Claims, 16 Drawing Sheets

FIG.2A SPHERICAL ABERRATION FNO 1.860

FIG.2B ASTIGMATISM IH=3.60

FIG.2C DISTORTION IH=3.60

FIG.2D CHROMATIC ABERRATION OF MAGNIFICATION IH=3.60

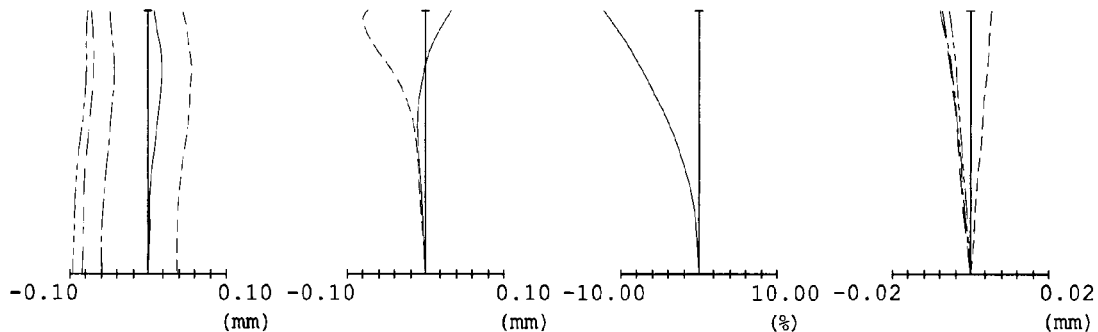

-0.10  0.10 (mm)   -0.10  0.10 (mm)   -10.00  10.00 (%)   -0.02  0.02 (mm)

FIG.2E SPHERICAL ABERRATION FNO 2.453

FIG.2F ASTIGMATISM IH=3.60

FIG.2G DISTORTION IH=3.60

FIG.2H CHROMATIC ABERRATION OF MAGNIFICATION IH=3.60

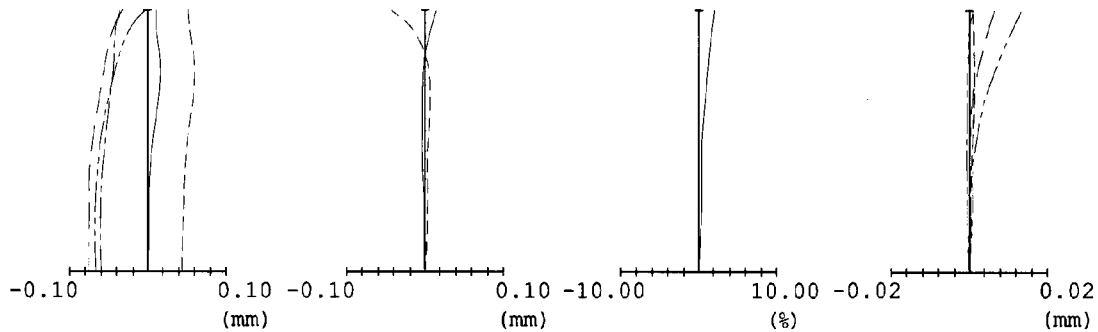

-0.10  0.10 (mm)   -0.10  0.10 (mm)   -10.00  10.00 (%)   -0.02  0.02 (mm)

FIG.2I SPHERICAL ABERRATION FNO 3.404

FIG.2J ASTIGMATISM IH=3.60

FIG.2K DISTORTION IH=3.60

FIG.2L CHROMATIC ABERRATION OF MAGNIFICATION IH=3.60

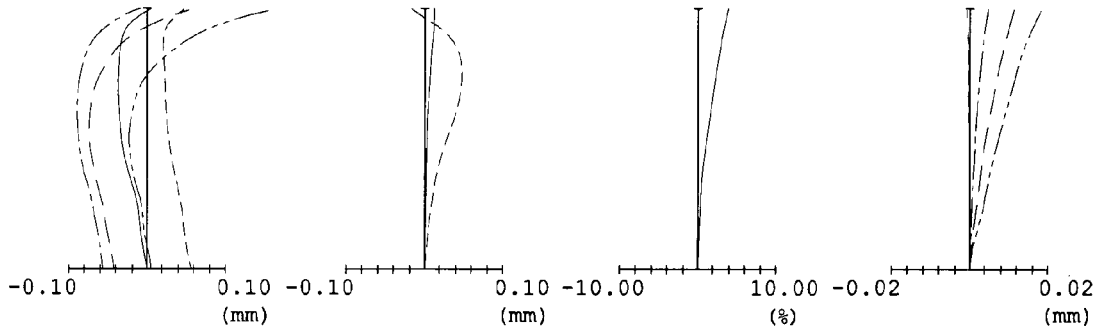

-0.10  0.10 (mm)   -0.10  0.10 (mm)   -10.00  10.00 (%)   -0.02  0.02 (mm)

404.66 —·—·—  486.13 —··—··—  587.56 ———
435.83 — — — —  656.27 — — — — — —

SPHERICAL ABERRATION
FNO 2.131

-0.10　　　0.10
(mm)

ASTIGMATISM
IH=3.60

-0.10　　　0.10
(mm)

DISTORTION
IH=3.60

-10.00　　　10.00
(%)

CHROMATIC ABERRATION OF MAGNIFICATION
IH=3.60

-0.02　　　0.02
(mm)

SPHERICAL ABERRATION
FNO 2.688

-0.10　　　0.10
(mm)

ASTIGMATISM
IH=3.60

-0.10　　　0.10
(mm)

DISTORTION
IH=3.60

-10.00　　　10.00
(%)

CHROMATIC ABERRATION OF MAGNIFICATION
IH=3.60

-0.02　　　0.02
(mm)

SPHERICAL ABERRATION
FNO 3.578

-0.10　　　0.10
(mm)

ASTIGMATISM
IH=3.60

-0.10　　　0.10
(mm)

DISTORTION
IH=3.60

-10.00　　　10.00
(%)

CHROMATIC ABERRATION OF MAGNIFICATION
IH=3.60

-0.02　　　0.02
(mm)

404.66 —··—　　486.13 —·—　　587.56 ———
435.83 ————　　656.27 ---------

FIG.6A
SPHERICAL ABERRATION
FNO 2.307
FIG.6B
ASTIGMATISM
IH=3.60
FIG.6C
DISTORTION
IH=3.60
FIG.6D
CHROMATIC ABERRATION OF MAGNIFICATION
IH=3.60
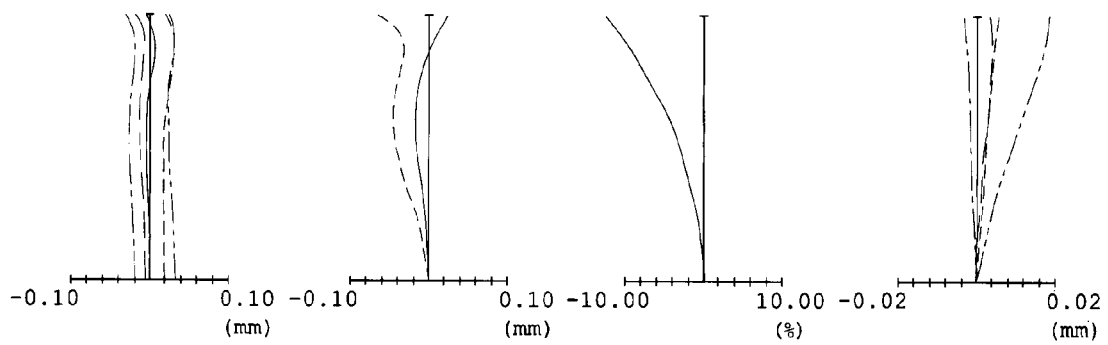
FIG.6E
SPHERICAL ABERRATION
FNO 2.916
FIG.6F
ASTIGMATISM
IH=3.60
FIG.6G
DISTORTION
IH=3.60
FIG.6H
CHROMATIC ABERRATION OF MAGNIFICATION
IH=3.60
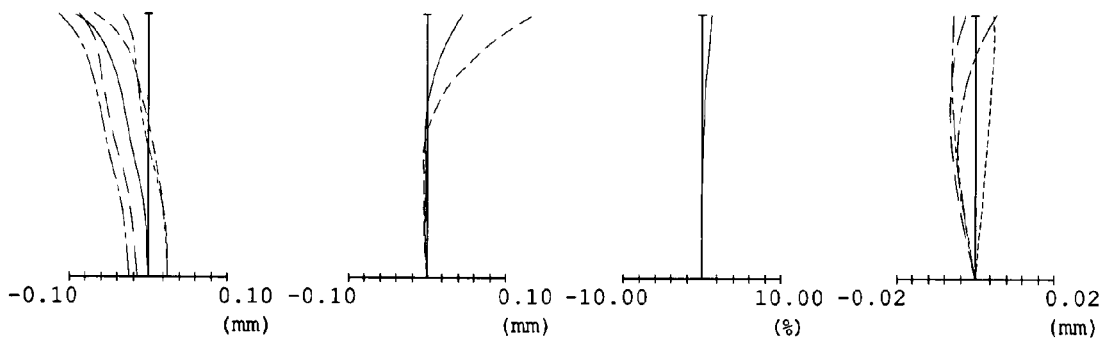
FIG.6I
SPHERICAL ABERRATION
FNO 3.997
FIG.6J
ASTIGMATISM
IH=3.60
FIG.6K
DISTORTION
IH=3.60
FIG.6L
CHROMATIC ABERRATION OF MAGNIFICATION
IH=3.60
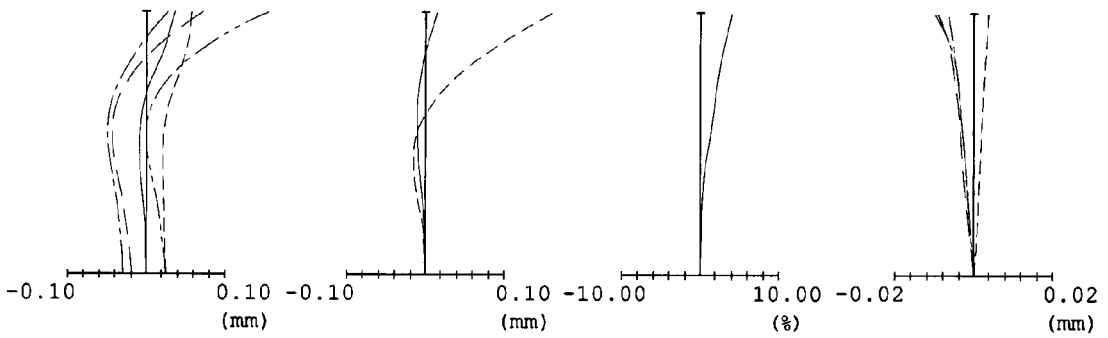
404.66 — · · —   486.13 — — —   587.56 ———
435.83 — — —   656.27 - - - - -

SPHERICAL ABERRATION  ASTIGMATISM  DISTORTION  CHROMATIC ABERRATION OF MAGNIFICATION

FNO 1.849  IH=3.60  IH=3.60  IH=3.60

SPHERICAL ABERRATION  ASTIGMATISM  DISTORTION  CHROMATIC ABERRATION OF MAGNIFICATION

FNO 2.456  IH=3.60  IH=3.60  IH=3.60

SPHERICAL ABERRATION  ASTIGMATISM  DISTORTION  CHROMATIC ABERRATION OF MAGNIFICATION

FNO 3.392  IH=3.60  IH=3.60  IH=3.60

404.66 —·—·—   486.13 —·—   587.56 ———
435.83 — — —   656.27 ----------

FIG.10A SPHERICAL ABERRATION FNO 1.869

FIG.10B ASTIGMATISM IH=3.60

FIG.10C DISTORTION IH=3.60

FIG.10D CHROMATIC ABERRATION OF MAGNIFICATION IH=3.60

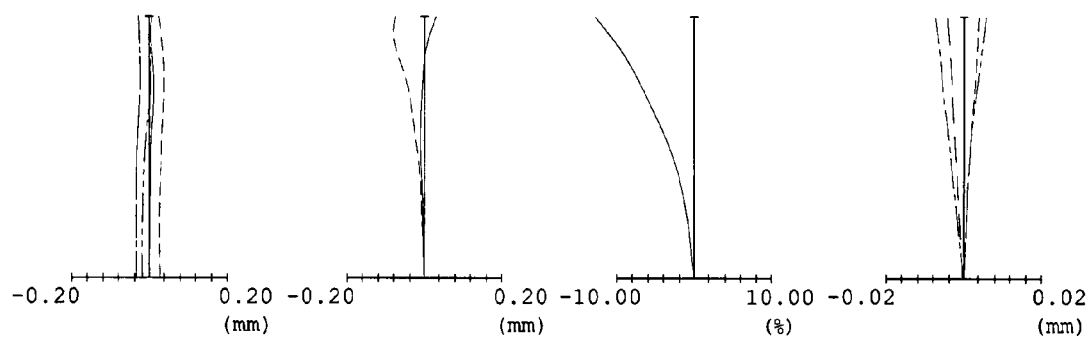

FIG.10E SPHERICAL ABERRATION FNO 2.462

FIG.10F ASTIGMATISM IH=3.60

FIG.10G DISTORTION IH=3.60

FIG.10H CHROMATIC ABERRATION OF MAGNIFICATION IH=3.60

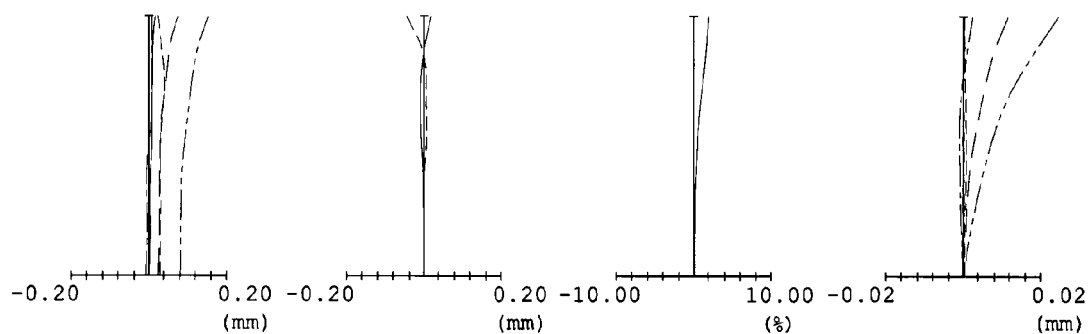

FIG.10I SPHERICAL ABERRATION FNO 3.424

FIG.10J ASTIGMATISM IH=3.60

FIG.10K DISTORTION IH=3.60

FIG.10L CHROMATIC ABERRATION OF MAGNIFICATION IH=3.60

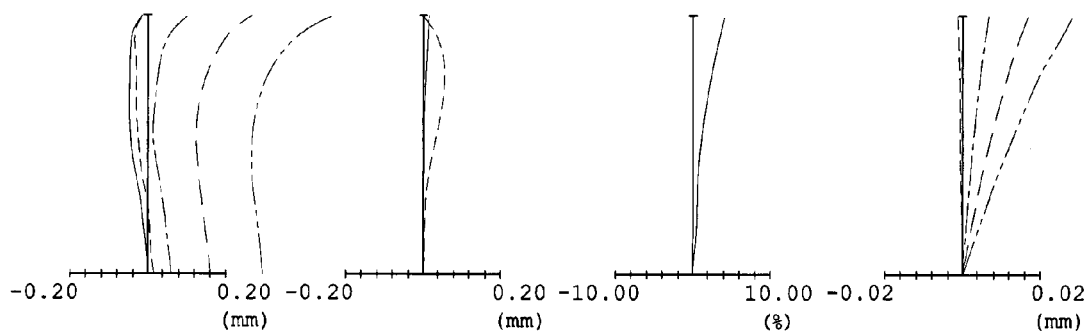

404.66 — · — · 486.13 — — — 587.56 ———
435.84 — — — — 656.27 - - - - - - -

FIG.12A
SPHERICAL ABERRATION
FNO 1.842
FIG.12B
ASTIGMATISM
IH=3.60
FIG.12C
DISTORTION
IH=3.60
FIG.12D
CHROMATIC ABERRATION OF MAGNIFICATION
IH=3.60
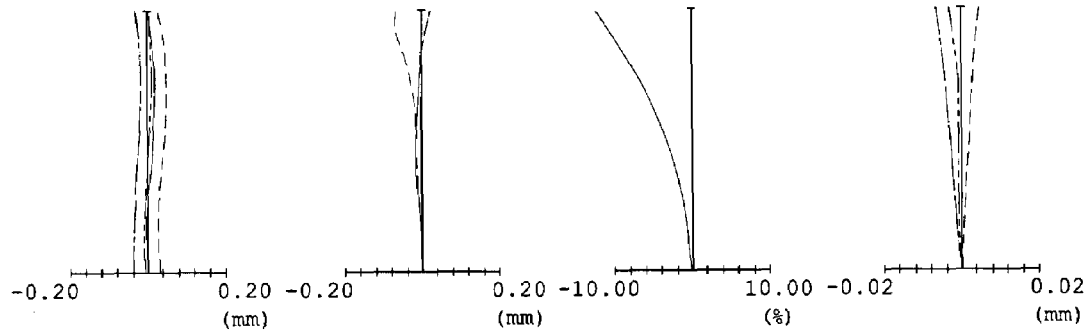
FIG.12E
SPHERICAL ABERRATION
FNO 2.426
FIG.12F
ASTIGMATISM
IH=3.60
FIG.12G
DISTORTION
IH=3.60
FIG.12H
CHROMATIC ABERRATION OF MAGNIFICATION
IH=3.60
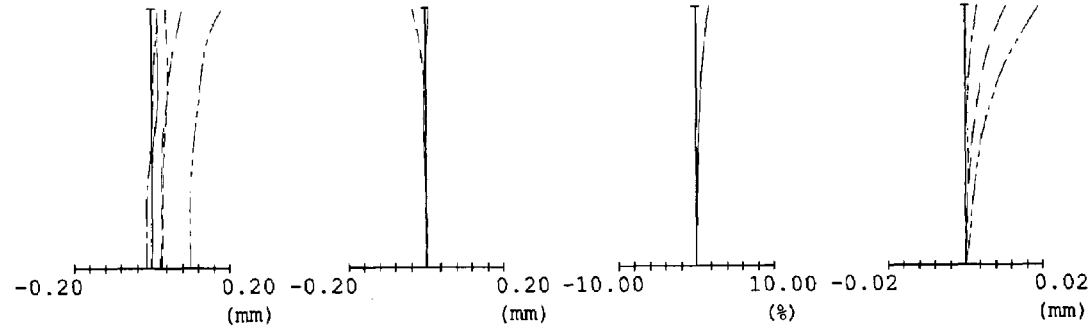
FIG.12I
SPHERICAL ABERRATION
FNO 3.379
FIG.12J
ASTIGMATISM
IH=3.60
FIG.12K
DISTORTION
IH=3.60
FIG.12L
CHROMATIC ABERRATION OF MAGNIFICATION
IH=3.60
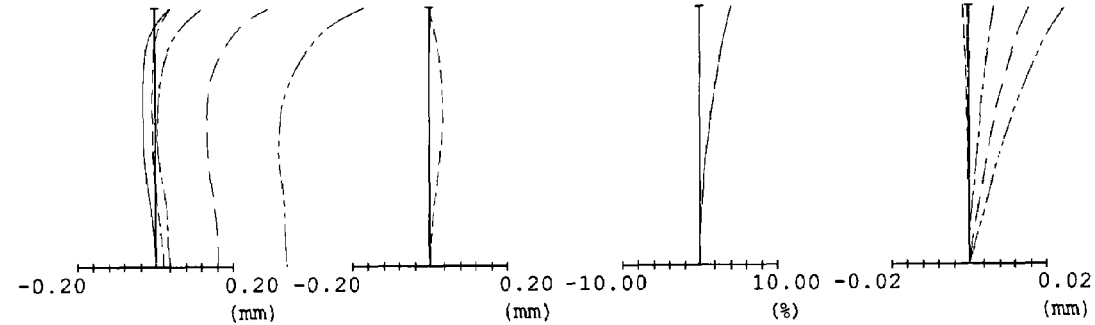
404.66 —·—·—  486.13 —··—··—  587.56 ———
435.84 — — — —  656.27 ----------

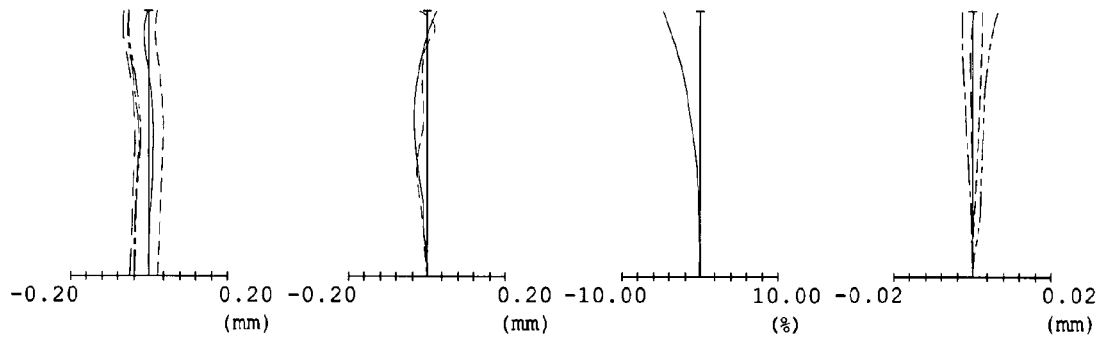

FIG.14A SPHERICAL ABERRATION FNO 2.601

FIG.14B ASTIGMATISM IH=3.84

FIG.14C DISTORTION IH=3.84

FIG.14D CHROMATIC ABERRATION OF MAGNIFICATION IH=3.84

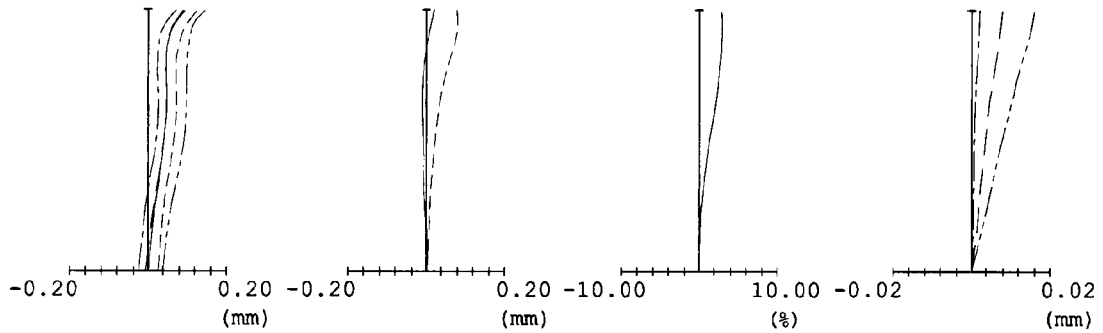

FIG.14E SPHERICAL ABERRATION FNO 3.440

FIG.14F ASTIGMATISM IH=3.84

FIG.14G DISTORTION IH=3.84

FIG.14H CHROMATIC ABERRATION OF MAGNIFICATION IH=3.84

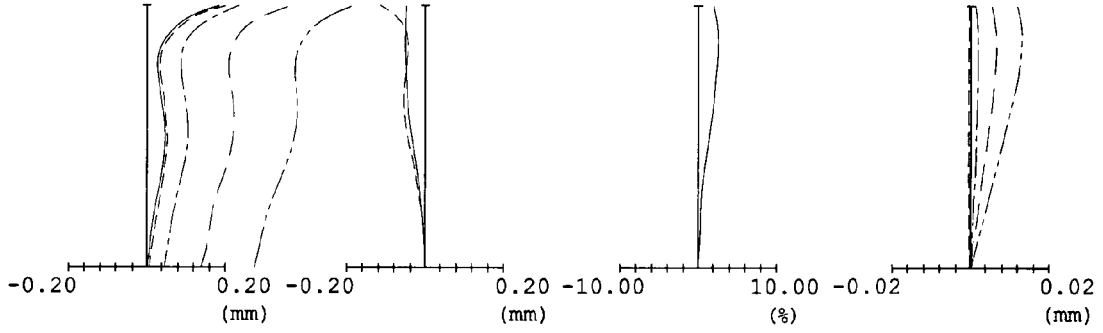

FIG.14I SPHERICAL ABERRATION FNO 4.944

FIG.14J ASTIGMATISM IH=3.84

FIG.14K DISTORTION IH=3.84

FIG.14L CHROMATIC ABERRATION OF MAGNIFICATION IH=3.84

404.66 —·—·—  486.13 —··—··—  587.56 ———
435.84 — — — —  656.27 ----------

ZOOM OPTICAL SYSTEM AND ELECTRONIC IMAGING APPARATUS USING THE SAME

This application claims benefits of Japanese Application No. 2006-316194 filed in Japan on Nov. 22, 2006, the contents of which are hereby incorporated by reference.

BACKGROUND OF THE INVENTION

1. Field of the Invention

The present invention relates to a zoom optical system which is an optical system suitable for especially an electronic imaging optical system, and has a large aperture, and is excellent at an image forming performance, and an electronic imaging apparatus using the same.

2. Description of the Related Art

The technology of digital camera has reached to practical use level in realizing a high pixel number (high quality picture), or a small thinning in size. Consequently, the digital camera has taken place for silver halide 35 mm film camera not only in function but also in market. Under such circumstance, there is a performance such that a photographic subject can be finely photographed even in an environment with little quantity of light as one of performances required in the next step. Thus, also in an optical system, while high image forming performance and thinning of it which have so far been achieved are kept as it is, a large aperture ratio has been demanded intensely.

So far, a positive refracting power preceding type zoom optical system has been known as a zoom optical system suitable for large aperture ratio. The positive refracting power preceding type zoom optical system comprises, in order from an object side, a first lens group having positive refracting power, a second lens group having negative refracting power, a third lens group having positive refracting power, and a fourth lens group having positive refracting power.

On the other hand, a negative refracting power preceding type zoom optical system has been known as a zoom optical system suitable for thinning. This negative refracting power preceding type zoom optical system comprises in order from the object side, a first lens group having negative refracting power, a second lens group having positive refracting power, and a third lens group having positive refracting power.

SUMMARY OF THE INVENTION

A zoom optical system according to the present invention is characterized in that it comprises a lens group A having one negative lens component at the most object side, and a lens group B arranged adjacent to the lens group A, wherein a distance on the optical axis between the lens group A and the lens group B is changed for magnification purpose, and the negative lens component consists of a cemented lens of positive lens $L_{AP}$ and a negative lens $L_{AN}$, and when a straight line expressed by $\theta gFp = \alpha p \times vdp + \beta p$ ($\alpha p = -0.00163$) is set in a rectangular coordinate system in which a horizontal axis is expressed by vdp and an vertical axis is expressed by $\theta gFp$, $v\, dp$ and $\theta gFp$ of the positive lens $L_{AN}$ is included in both of a domain which a straight line at a lower limit of the following condition (1) and a straight line at an upper limit of the condition (1), and a domain which is specified by the following condition (2).

$$0.6400 < \beta p < 0.9000 \tag{1}$$

$$3 < vdp < 27 \tag{2}$$

here, $\theta gFp$ is a ratio of a partial dispersion $(ng-nF)/(nF-nC)$ of the positive lens $L_{AN}$; $v\, dps$ is Abbe number $(nd-1)/(nF-nC)$ of the positive lens $L_{AN}$; nd is refractive index to d line; nC is refractive index to C line; nF is refractive index to F line; and ng is refractive index to g line.

In the zoom optical system of the present invention, when a straight line expressed by $\theta hgp = \alpha hgp \times vdp + \beta hgp$ (here, $\alpha hgp = -0.00225$) is set up in a rectangular coordinate system in which a horizontal axis is expressed by vdp and an vertical axis is expressed by $\theta hgp$, it is desired that $v\, dp$ and $\theta ngp$ of the positive lens $L_{AN}$ are included in both of a domain which is specified by a straight line at a lower limit of the following condition (3) and by a straight line at the maximum value of the condition (3), and a domain which is specified by the following condition (2).

$$0.5700 < \beta hgp < 0.9500 \tag{3}$$

$$3 < vdp < 27 \tag{2}$$

here, $\theta hgp$ is a ratio of a partial dispersion $(nh-ng)/(nF-nC)$ of the positive lens $L_{AN}$, vdp are Abbe number $(nd-1)/(nF-nC)$ of the positive lens $L_{AN}$, nd is refractive index to d line, nC is refractive index to C line, nF is refractive index to F line, ng is refractive index to g line, and nh is refractive index to h line.

Moreover, in the present invention, it is desired that the condition (4) is satisfied.

$$0.08 \leq \theta gFp - \theta gFn \leq 0.50 \tag{4}$$

here, $\theta$ gFp is a ratio of a partial dispersion $(ng-nF)/(nF-nC)$ of the positive lens $L_{AP}$; $\theta$ gFp is a ratio of a partial dispersion $(ng-nF)/(nF-nC)$ of the negative lens $L_{AN}$; nC is refractive index to C line; nF is refractive index to F line; and ng is refractive index to g line.

In the zoom optical system according to the present invention, it is desired that the following condition (5) is satisfied.

$$0.09 \leq \theta\, hgp - \theta\, hgn \leq 0.60 \tag{5}$$

here, $\theta$ hgp is a ratio of a partial dispersion $(nh-ng)/(nF-nC)$ of the positive lens $L_{AN}$; $\theta$ hgn is a ratio of a partial dispersion $(nh-ng)/(nF-nC)$ of the negative lens $L_{AN}$; nC is refractive index to Cline; nF is refractive index to F line; ng is refractive index to g line; and nh is refractive index to h line.

In the zoom lens system according to the present invention, it is desired that the following condition (6) is satisfied.

$$v\, dp - v\, dn \leq -30 \tag{6}$$

here, $v$ dp is Abbe number $(nd-1)/(nF-nC)$ of the positive lens $L_{AN}$; $v$ dn is the Abbe number $(nd-1)/(nF-nC)$ of the negative lens $L_{AN}$; nd is refractive index to d line; nC is refractive index to C line; and nF is refractive index to F line.

In the zoom optical system of the present invention, it is desired that refractive index ndp to d line of the positive lens $L_{AP}$ satisfies the following condition (7).

$$1.50 \leq ndp \leq 1.85 \tag{7}$$

In the zoom optical system of the present invention, it is desired that the positive lens $L_{AP}$ is a lens using energy hardening type resin, which is formed directly on the negative lens $L_{AN}$.

In the zoom optical system of the present invention, it is desired that the cemented lens is constituted such that the negative lens $L_{AN}$ and the positive lens $L_{AP}$ are cemented in order from the object side.

In the zoom optical system of the present invention, when an aspherical surface is expressed by the following formula (8), where a direction of an optical axis is z, a direction which intersects perpendicularly to the optical axis is h, a cone coefficient is k, and an aspherical coefficient is represented by A4, A6, A8, and A10, and a radius of curvature of spherical surface component on the optical axis is R, $$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (8)$$

When come out and expressed, it is desirable to satisfy the following condition (9).

$$0.1 \leq |z_{AR}(h) - z_{AC}(h)|/tp \leq 0.96 \quad (9)$$

here, $z_{AC}$ is a form of the surface at a cemented side according to the condition (8) in the positive lens $L_{AP}$; $z_{AR}$ is a form of the surface at an air contact side according to the condition (8) in the positive lens $L_{AP}$, h is h=0.7 fw when the focal length of the whole zoom optical system at the wide angle end is set to fw; tp is a thickness on the optical axis of the positive lens $L_{AP}$, and always z(0)=0.

In the zoom optical system of the present invention, when an aspherical surface is expressed by the following condition (8), where a direction of an optical axis is z, a direction which intersects perpendicularly to the optical axis is h, a cone coefficient is k, and an aspherical coefficient is represented by A4, A6, A8, and A10, and a radius of curvature of spherical surface component on the optical axis is R, $$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (8)$$

It is desired that conditions (8) and (9) are satisfied, $$-50 \leq k_{AF} \leq 10 \quad (11)$$

$$-150 \leq k_{AR} \leq 20 \quad (12)$$

Furthermore, it is desirable to satisfy the following condition (13).

$$-8 \leq z_{AF}(h)/z_{AR}(h) \leq 2 \quad (13)$$

here, $k_{AF}$ is k value concerning a surface at the most object side in the lens group A; $k_{AR}$ is k value concerning a surface at the most image side in the lens group A, and all of which are k values in the condition (8); $z_{AF}$ is k value concerning a surface at the most object side in the lens group A; and $k_{AR}$ is k value concerning a surface at the most image side in the lens group A; and h is h=0.7 fw when the focal length of the whole zoom optical system at the wide angle end is set to fw.

In the zoom optical system of the present invention, it is desirable that the cemented surface of the cemented lens is an aspherical surface.

In the zoom optical system of the present invention, as for the aspherical surface of the cemented surface of the cemented lens, it is so desirable to have the stronger convergence than that of spherical surface, as the more it is departed from an optical axis.

In the zoom optical system of the present invention, it is desired that the difference of refraction index in d line of the positive lens $L_{AP}$ and the negative lens $L_{AN}$ is 0.2 or less.

In the zoom optical system of the present invention, when magnification from a wide angle end to a telephoto end is carried out, it is desired that the lens group A moves toward an image side at first, and then it moves toward an object side along the optical axis, that is to say, it moves to two directions (toward the image side and the object side).

In the zoom optical system of the present invention, it is desired that the lens group B is constituted with two lens components, or a single lens component and a cemented lens component, or three lenses.

In the zoom optical system of the present invention, it is desired that a negative lens group C and a positive lens group D in which a mutual distance is variable are arranged at the image side of the lens group B.

In the zoom optical system of the present invention, it is desirable that the lens group C consists only of a negative lens, and the lens group D consists only of a positive lens.

In the zoom optical system of the present invention, it is desired that the positive lens group C and the lens group D consisting of a meniscus lens having a convex surface directed toward the image side in which a mutual distance is variable are arranged at the image side of the lens group B.

In the zoom optical system of the present invention, it is desired that the lens group C consists of a positive lens only.

An imaging apparatus provided with the zoom optical system according to the present invention comprises, a zoom optical system, and an electronic image element arranged near an imaging position of this zoom optical system, wherein an image formed by the zoom optical system is photographed by the electronic imaging element, and an image data photographed by the electronic imaging element is processed electrically, and then an image data to which the form was changed can be output, and is characterised in that the zoom optical system is the zoom optical system mentioned above, and when focusing is carried out at almost nearly infinite object point, the following condition (19) is satisfied;

$$0.7 < y_{07}/(fw \cdot \tan \omega_{07w}) < 0.94 \quad (19)$$

here, $y_{07}$ is expressed by $y_{07} = 0.7 y_{10}$ when a distance to the most distant point from a center (maximum image height) within an effective imaging surface of the electronic imaging element (within the surface in which photographing can be performed) is set to $y_{10}$; $\omega_{07w}$ is an angle to the optical axis of the direction of an object point corresponding to an image point connected to the position of $y_{07}$ from the center on the imaging surface at a wide angle end; and fw is a focal length of the whole zoom optical system at the wide angle end.

According to the present invention, chromatic aberration especially required severely when an optical system is constituted to have a large aperture ratio can be corrected well. Consequently, chromatic aberration is corrected well, and furthermore, a zoom optical system having large aperture ratio, and an imaging apparatus provided with the same can be obtained. Moreover, in a zoom optical system, a thinning of shape as well as a large aperture ratio can be obtained.

These and other features and advantages of the present invention will become apparent from the following detailed description of the preferred embodiments when taken in conjunction of the accompanying drawings.

BRIEF DESCRIPTION OF THE DRAWINGS

FIGS. 2A~2D, 2E~2H, and 2I~2L are figures showing spherical aberration, astigmatism, distortion, distortion, distortion, and chromatic aberration of magnification respectively when focusing is carried out at the infinite object point of the zoom optical system of FIG. 1, and show states in the wide angle end, the middle position, and the telephoto end, respectively.

FIGS. 6A~6D, 6E~6H, and 6I~6L are figures showing spherical aberration, astigmatism, distortion, distortion, and chromatic aberration of magnification respectively, when focusing is carried out at the infinite object point of the zoom optical system of FIG. 5, and show states in the wide angle end, the middle position, and the telephoto end, respectively.

FIGS. 10A~10D, 10E~10H, and 10I~10L are figures showing spherical aberration, astigmatism, distortion, and chromatic aberration of magnification respectively, when focusing is carried out at the infinite object point of the zoom optical system of FIG. 9, and show states in the wide angle end, the middle position, and the telephoto end, respectively.

FIGS. 12A~2D, 12E~12H, and 12I~12L are figures showing spherical aberration, astigmatism, distortion, and chromatic aberration of magnification respectively, when focusing is carried out at the infinite object point of the zoom optical system of FIG. 11, and show states in the wide angle end, the middle position, and the telephoto end, respectively.

FIGS. 14A~2D, 14E~14H, and 14I~14L are figures showing spherical aberration, astigmatism, distortion, and chromatic aberration of magnification respectively, when focusing is carried out at the infinite object point of the zoom optical system of FIG. 13, and show states in the wide angle end, the middle position, and the telephoto end, respectively.

DETAILD DESCRIPTION OF THE PREFERRED EMBODIMENTS

Figure 1A:
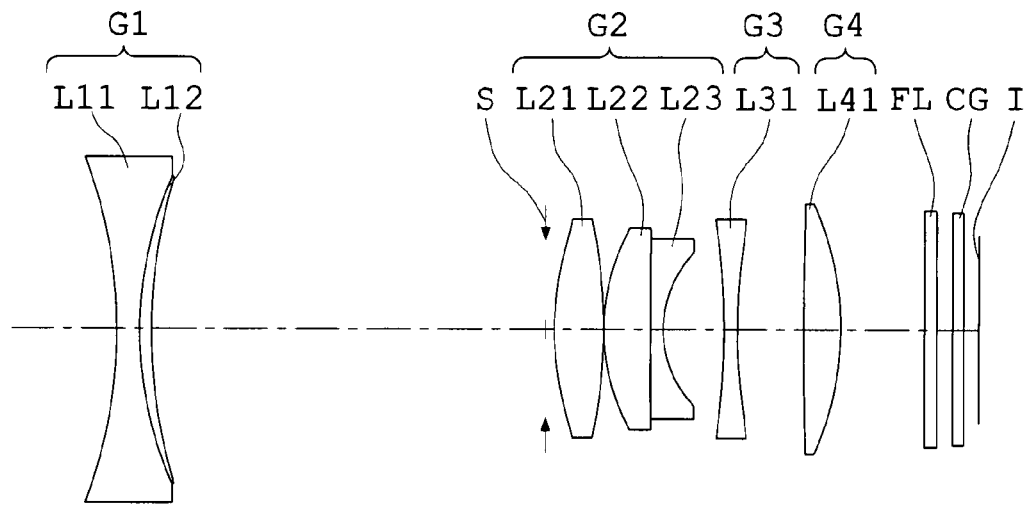
FIGS. 1A, 1B and 1C are sectional views showing an optical arrangement developed along an optical axis at a wide angle end, a middle position and a telephoto end respectively of the zoom lens system when focusing is carried out at the infinite object point in an embodiment 1 according to the present invention.

Prior to explanation of embodiments, function and effect of the present invention will be explained.

A zoom optical system of the resent invention comprises a lens group A having one negative lens component at the utmost object side, and a lens group B arranged adjacent to the lens group A, wherein a distance between the lens group A and the lens group B between on the optical axis is changed for magnification purpose, and the negative lens component consists of a cemented lens of a positive lens $L_{AP}$ and a negative lens $L_{AN}$.

If large aperture ratio aperture ratio is adopted in an optical system, it becomes easy to generate chromatic aberration greatly. For this reason, it is desirable to adopt such composition that the positive lens $L_{AP}$ is cemented to the negative lens $L_{AN}$ as negative lens component composition of the lens group A as shown in the zoom optical system of the present invention. If lens group A is constituted with only one lens component, it will be very effective for thinning in depth direction of an optical system. The effect will become very great when a collapsible lens barrel is adopted especially.

In a rectangular coordinate system in which a horizontal axis is expressed by vdp and an vertical axis is expressed by θgFp, when a straight line expressed by θgFp=αp×vdp+βp (αp=−0.00163) is set up, v dp and θgFp of positive lens $L_{AP}$ are made to be included in both of a domain which is specified by a straight line at a lower limit of the following condition (1) and by a straight line at the maximum value of the condition (1), and a domain which is specified by the following condition (2).

$$0.6400 < \beta p < 0.9000 \quad (1)$$

$$3 < vdp < 27 \quad (2)$$

here, θ gFp is a ratio of a partial dispersion (ng−nF)/(nF−nC) of the positive lens $L_{AP}$; v dp is Abbe number (nd−1)/(nF−nC) of the positive lens $L_{AP}$; nd is refractive index to d line; nC is refractive index to C line; nF is refractive index to F line; and ng is refractive index to g line.

If it is less than the lower limit of condition (1), when an optical system has large aperture ratio aperture ratio, chromatic aberration by a secondary spectrum, that is, chromatic aberration correction of g line when achromatism is carried out by F line and C line cannot be fully performed. Therefore, it is hard to secure sharpness in a photographed picture of the subject when a photographic subject is photographed by the optical system, On the other hand, if it exceeds the maximum value of the condition (1), correction of a secondary spectrum becomes excessive when the optical system has a large aperture ratio aperture ratio. Therefore, as same as the case that it is less than the lower limit of the condition (1), it is hard to secure sharpness in a photographed picture of the subject.

If it is less than the lower limit of the condition (2) or exceeds the maximum value of the condition (2), achromatism of F line and C line becomes difficult and change of the chromatic aberration at the time of zooming becomes large when the optical system has large aperture ratio aperture ratio. Therefore, it is difficult to secure sharpness in a photographed picture of the subject when a photographic subject is photographed by the optical system.

It is more desired that the following condition (1') is satisfied instead of the condition (1).

$$0.6800 < \beta p < 0.8700 \quad (1')$$

It is much more desired that the following condition (1") is satisfied instead of the condition (1).

$$0.6900 < \beta p < 0.8200 \quad (1'')$$

In a rectangular coordinate system in which a horizontal axis is expressed by νdp and an vertical axis is expressed by θhgp when a straight line expressed by θhgp=αhgp×vdp+βhgp (here, αhgp=−0.00225) is set up, it is desired that ν dp and θhgp of the positive lens $L_{AP}$ are included within both of a domain which a straight line at a lower limit of the following condition (3), and a straight line at an upper limit of the condition (3), and a domain which is specified by the following condition (2).

$$0.5700 < \beta hgp < 0.9500 \quad (3)$$

$$3 < \nu dp < 27 \quad (2)$$

here, θh is a ratio of a partial dispersion (nh−ng)/(nF−nC) of the positive lens $L_{AP}$; ν dp is Abbe number (nd−1)/(nF−nC) of the positive lens $L_{AP}$; nd is refractive index to d line; nC is refractive index to C line, nF is refractive index to F line; ng is refractive index to g line; and nh is refractive index to h line.

If it is less than the lower limit of the condition (3), when the optical system has large aperture ratio, chromatic aberration by a secondary spectrum, that is, chromatic aberration correction of h line when achromatism is carried out by F line and C line cannot be fully performed. Therefore, when a photographic subject is photographed by the optical system, it is easy to generate a purple color flare and a color blot in a pictorial image of the photographic subject.

On the other hand, if it exceeds the upper limit of the condition (3), when the optical system has large aperture ratio aperture ratio, chromatic aberration by a secondary spectrum, that is, chromatic aberration correction of h line when achromatism is carried out by F line and C line becomes excessive. Therefore, when a photographic subject is photographed by the optical system, it is easy to generate a purple color flare and a color blot in a pictorial image of photographic subject.
It is more desired that the following condition (3') is satisfied instead of the condition (3).

$$0.6200 < \beta hgp < 0.9200 \quad (3')$$

It is much more desired that the following condition (3") is satisfied instead of the condition (3).

$$0.6500 < \beta hgp < 0.8700 \quad (3'')$$

In the zoom optical system of the present invention, if the following condition (4) is satisfied, compensation effect to a secondary spectrum becomes large when an optical system has large aperture ratio aperture ratio. Therefore, sharpness effect increases in a pictorial image of the photographic subject.

$$0.08 \leq \theta gFp - \theta gFn \leq 0.50 \quad (4)$$

here, θgFp is a ratio of a partial dispersion (ng−nF)/(nF−nC) of the positive lens $L_{AP}$; θ gFn is a ratio of a partial dispersion (ng−nF)/(nF−nC) of the negative lens $L_{AN}$; nC is refractive index to C line; nF is refractive index to F line; and ng is refractive index to g line.

It is much desired that the following condition (4') is satisfied instead of the condition (4).

$$0.10 \leq \theta gFp - \theta gFn \leq 0.40 \quad (4')$$

It is the best if the following condition (4") is satisfied instead of the condition (4).

$$0.12 \leq \theta gFp - \theta gFn \leq 0.30 \quad (4'')$$

In the zoom optical system of the present invention, it is desirable to satisfy the following condition (5). In this case, a color flare and a color blot are mitigable in a pictorial image of the photographic subject.

$$0.09 \leq \theta 0 \, hgp - \theta \, hgn \leq 0.60 \quad (5)$$

here, θh is a ratio of a partial dispersion (nh−ng)/(nF−nC) of the positive lens $L_{AP}$; θ hgn is partial dispersion ratio (nh−ng)/(nF−nC) of negative lens $L_{AN}$; nC is refractive index to C line; nF is refractive index to F line; ng is refractive index to g line; and nh is refractive index to h line.

It is much desired that the following condition (5') is satisfied instead of the condition (5).

$$0.12 \leq \theta \, hgp - \theta \, hgn \leq 0.50 \quad (5')$$

It is the best if the following condition (5") is satisfied instead of the condition (5).

$$0.15 \leq \theta \, hgp - \theta \, hgn \leq 0.40 \quad (5'')$$

In the zoom optical system of the present invention, if the condition (6) is satisfied, it is easy to carry out achromatism of C line and F line of axial chromatic aberration and chromatic aberration of magnification.

$$\nu \, dp - \nu \, dn \leq -30 \quad (6)$$

here, νdp is Abbe number (nd−1)/(nF−nC) of the positive lens $L_{AP}$; ν dn is Abbe number (nd−1)/(nF−nC) of the negative lens $L_{AN}$; nd is refractive index to d line; nC is refractive index to C line; and nF is refractive index to F line.

It is much desired that the following condition (6') is satisfied instead of the condition (6).

$$\nu \, dp - \nu \, dn \leq -40 \quad (6')$$

It is the best if the following condition (6") is satisfied instead of the condition (6).

$$\nu \, dp - \nu \, dn \leq -50 \quad (6'')$$

If the lens group A is constituted with one lens component, it is easy to become disadvantageous in respect of astigmatic correction in comparison with such case that it is constituted by two or more lens components.

However, in the zoom optical system of the present invention, if refractive index ndp to d line of the positive lens $L_{AP}$ (optical material used for the positive lens $L_{AP}$) of the lens group A satisfies the following condition (7), it is advantageous to astigmatic correction.

$$1.50 \leq ndp \leq 1.85 \quad (7)$$

If it is less than the lower limit of condition (7), astigmatic correction cannot fully be carried out.

On the other hand, if it exceeds the maximum value of the condition (7), coma aberration cannot be fully corrected.

It is much desired that the following condition (7') is satisfied instead of the condition (7).

$$1.55 \leq ndp \leq 1.80 \tag{7'}$$

It is the best if the following condition (7") is satisfied instead of the condition (7).

$$1.57 \leq ndp \leq 1.77 \tag{7''}$$

By the way, optical glass satisfying the conditions (1) and (2) is difficult to obtain. However, by using organic materials including resin and the like, or other materials, optical characteristics of which are changed by diffusing inorganic particulates into such organic materials, it is possible to obtain easily optical materials satisfying the conditions (1) and (2). When the organic material satisfying the conditions (1) and (2) is used as an optical material of the positive lens $L_{AP}$, it is good to adopt a cemented lens in order to process (to form) the positive lens $L_{AP}$ as thinly as possible. That is, this positive lens $L_{AP}$ is directly formed on the negative lens $L_{AN}$, using an energy hardening type resin as an optical material of the positive lens $L_{AP}$. In that case, taking into consideration of durability of resin, it is desired that the negative lens component of lens group A, namely, the cemented lens is constituted such that the negative lens $L_{AN}$ and the positive lens $L_{AP}$ are cemented in order from the object side.

With respect to a form of lens, it is good to satisfy the followings. With respect to a form of an aspherical surface, when an aspherical surface is expressed by the following condition (8), where a direction of an optical axis is z, a direction which intersects perpendicularly to the optical axis is h, a cone coefficient is k, and an aspherical coefficient is represented by A4, A6, A8, and A10, and a radius of curvature of spherical surface component on the optical axis is R, and it is desirable to satisfy the following condition (9).

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \tag{8}$$

$$0.1 \leq |z_{AR}(h) - z_{AC}(h)|/tp \leq 0.96 \tag{9}$$

here, $z_{AC}$ is a form of the surface at a cemented side in the positive lens $L_{AP}$; $z_{AR}$ is a form of the surface at an air-contact side in the positive lens $L_{AP}$ all of which are forms according to the condition (8); and h is expressed by h=0.7 fw when the focal length of the whole zoom optical system at the wide angle end is set to fw; tp is a thickness on the optical axis of the positive lens $L_{AP}$; and, always z(0)=0.

If it is less than the lower limit of condition (5), coma aberration cannot be fully corrected.

On the other hand, if it exceeds the maximum value of the condition (9), it becomes difficult to secure the thickness of peripheral portion in the positive lens $L_{AP}$. Namely, when the positive lens $L_{AP}$ is processed to be formed thin, it becomes difficult to secure the thickness of peripheral portion having the predetermined quantity although it is necessary to secure a predetermined quantity for the thickness of peripheral portion.

It is much desired that the following condition (9') is satisfied instead of the condition (9).

$$0.3 \leq |z_{AR}(h) - z_{AC}(h)|/tp \leq 0.94 \tag{9'}$$

It is the best if the following condition (9") is satisfied instead of the condition (9").

$$0.5 \leq |z_{AR}(h) - z_{AC}(h)|/tp \leq 0.92 \tag{9''}$$

Or, as to a surface form at the utmost object side, and a surface form at the utmost image side of the lens group A, astigmatism can be corrected effectively by the followings: That is, when a form of an aspherical surface is expressed by the condition (8), the conditions (11) and (12) are satisfied, $$-50 \leq k_{AF} \leq 10 \tag{11}$$

$$-150 \leq k_{AR} \leq 20 \tag{12}$$

Furthermore, it is desirable to satisfy the following condition (13).

$$-8 \leq z_{AF}(h)/z_{ar}(h) \leq 2 \tag{13}$$

here, $k_{AF}$ is k value concerning a surface at the most object side in the lens group A, $k_{AR}$ is k value concerning a surface at the most image side in the lens group A, all of which are k values in the condition (8), $z_{AF}$ is k value concerning a surface at the most object side in the lens group A, and $k_{AR}$ is k value concerning a surface at the most image side in the lens group A, and h is expressed by h=0.7 fw, when the focal length of the whole zoom optical system at the wide angle end is set to fw.

If it is exceeds the upper limit of condition (13), it is easy to become disadvantageous for astigmatic correction. On the other hand, if it is less than the lower limit of condition (13), an amount of generated distortion becomes remarkably large. Therefore, even if the distortion is corrected by using the image-processing function mentioned later, by such correction, a peripheral portion of a pictorial image will be expanded to a radiation direction (direction which runs from a center of the pictorial image to a peripheral portion). As a result, resolving of meridional direction of the peripheral portion gets worse easily.

It is more desired that the following condition (13') is satisfied instead of the condition (13).

$$-4 \leq z_{AF}(h)/z_{AR}(h) \leq 0 \tag{13'}$$

It is the best if the following condition (13") is satisfied instead of the condition (13').

$$2 \leq zAF(h)/zAR(h) \leq -0.3 \tag{13''}$$

It is desired that the cemented surface of the cemented lens is an aspherical surface. In a zoom lens, generally, the simpler lens composition is, the more difficult simultaneous correction of chromatic aberration of magnification at a telephoto side and at a wide angle side becomes. Then, if the cemented surface of the lens group at the utmost object side is formed an aspherical surface, simultaneous correction becomes easy since chromatic aberration of magnification can be controlled only at the wide angle side.

It is desired that the aspherical surface of the cemented surface of a cemented lens has the stronger convergence rather than that of a spherical surface as it is the more departed from an optical axis. When a lens group at the object side is formed thin and simple, there is a tendency such that correction of chromatic aberration of magnification at the wide angle side become more insufficient than that at the telephoto side. Accordingly, by forming the cemented surface of a lens group at the utmost object side having an aspherical surface wherein the stronger the convergence is, the more departed from the optical axis it is, insufficient correction at the wide angle end can be solved.

It is desired that the difference of refraction index in d line of the positive lens $L_{AP}$ and the negative lens $L_{AN}$ is 0.2 or less.

This is a condition for preventing worsening of other aberrations when chromatic aberration of magnification at the wide angle side is corrected. If it exceeds this, a coma aberration and astigmatism will get worse easily. If the difference of the refractive index is 0.14 or less, it is better. If the difference of the above-mentioned refractive index is 0.065 or less, it is better.

In the zoom optical system of the present invention, it is desired that the lens group A moves firstly toward an image side, and then it moves two directions (directions toward an object side and an image side) along the optical axis when magnification from a wide angle end to a telephoto end. By such constitution mentioned above, whole length of the optical system can be shortened and accordingly, it is effective for thinning of a lens holding barrel when a collapsible lens barrel is used.

When an optical system is constituted so as to have large aperture ratio aperture ratio, for example, when F value of the optical system is made smaller than F/2.8, it becomes easy to generate astigmatism when lens group A is constituted with one lens component only, Therefore, it is better to constitute so as to correct astigmatism by a lens group other than the lens group A.

Accordingly, in the present invention, in order to correct chromatic aberration and astigmatism well, it is desired that the lens group B is constituted with two lens components, or a single lens component and a cemented lens component, or three lenses. Here, it is desired that the lens group B has positive refracting power, and it comprises in order from the object side a positive single lens component B1, and a cemented lens component B2 in which lenses are arranged in order of a positive lens, a negative lens and a negative lens. Otherwise, it is desired that the lens group B has positive refracting power, and it is constituted with a positive single lens component B1 and a cemented lens component B2 which has in order of a positive lens, a negative lens and a negative lens. In these compositions, it is desired that average value $_{AVE}nd_{2p}$ of refractive indices of all of positive lenses of the lens component B1 and the lens component B2 is 1.8 or more. By this way, astigmatism can be corrected well. If $_{AVE}nd_{2p}$ is less than 1.8, it becomes difficult to correct astigmatism well.

In the zoom optical system of the present invention, it is good that two lens groups having a negative lens group C and a positive lens group D in which a mutual distance is variable are arranged at the image side of the lens group B. By this way, even if large aperture ratio at the wide angle end is, for example, less than F/2.8, correction of astigmatism at sufficient level can be achieved throughout whole region of zooming and focusing. Especially, it is desired that the lens group C and the lens group D are moved while expanding monotonously its relative distance when magnification is carried out from the wide angle end to the telephoto end. Otherwise, it is desired that both of the lens group C and the lens group D are moved so that lens group D may approach an image forming point. In this way, variation of astigmatism at the wide angle end and variation of the astigmatism when magnification is carried out can be suppressed.

Moreover, it is good for an interval $d_{CD}$ between the lens group C and the lens group D on the optical axis when focusing is carried out at the infinite object point at the wide angle end satisfies the following condition (14).

$$0.2 \leq d_{CD}/fw \leq 1.2 \tag{14}$$

If it is less than a lower limit of the condition (14), it becomes difficult to correct well astigmatism throughout zooming range. It becomes difficult to make degree of sensitivity to eccentricity low in each of the lens group C and the lens group D.

On the other hand, if it exceeds the upper limit of condition (14), it becomes difficult to make a lens barrel thin when the lens barrel is collapsible.

It is more desired that the following condition (14') is satisfied instead of the condition (14).

$$0.25 \leq d_{CD}/fw \leq 0.9 \tag{14'}$$

It is the best if the following condition (14") is satisfied instead of the condition (14).

$$0.3 \leq d_{CD}/fw \leq 0.6 \tag{14"}$$

It is desired that the lens group C and the lens group D are moved changing mutual interval when focusing is carried out. By this way, variation of astigmatism by focusing can be reduced. Especially, it is good that focusing of the lens group A and the lens group B is carried out that at the shorter distance in a resting state, the lens group C and the lens group D are moved more so as to narrow the mutual distance.

In this way, variation of astigmatism by focusing can be reduced. By the way, according to the present invention, two lens groups are arranged at the image side of the lens group B even though one lens group could have been arranged there. Accordingly, thickness of a lens holding barrel of a collapsible type camera increases by an amount of thickness of the one lens group.

Then, in order to suppress increase of the thickness as much as possible, it is good to adopt the following measures a or b.

a. The lens group C is constituted with a positive lens only, and the lens group D is constituted with a negative lens only.

b. The lens group C and the lens group D are constituted so as to satisfy the following conditions (15) and (16), where a radius of curvature on an optical axis at the utmost object side is denoted by $R_{CF}$ and $R_{DF}$, and a radius of curvature on optical axis at the most image side is denoted by $R_{RC}$ and $R_{DR}$ with respect to each of lens group C and the lens group D, $$-1.5 \leq (R_{CF}+R_{CR})/(R_{CF}-R_{CR}) \leq 1.5 \tag{15}$$

$$0.0 \leq (R_{DF}+R_{DR})/(R_{DF}-R_{DR}) \leq 1.5 \tag{16}$$

By this way, a dead spaces among the lens group B, the lens group C and the lens group D can be reduced as much as possible when a lens holding barrel is stored into a collapsible type camera body. Here, when a surface of a lens is aspherical, $R_{CF}$, $R_{RC}$, $R_{DF}$, $R_{DR}$ are paraxial radius of curvature of surface of the lens.

It is more desirable to satisfy the following conditions (15') and (16') instead of the conditions (15) and (16).

$$-1.2 \leq (R_{CF}+R_{CR})/(R_{CF}-R_{CR}) \leq 1.2 \tag{15'}$$

$$0.3 \leq (R_{DF}+R_{DR})/(R_{DF}-R_{DR}) \leq 1.2 \tag{16'}$$

It is the best if the following conditions (15") and (16") are satisfied instead of the conditions (15) and (16).

$$-1.0 \leq (R_{CF}+R_{CR})/(R_{CF}-R_{CR}) \leq 1.0 \tag{15"}$$

$$0.6 \leq (R_{DF}+R_{DR})/(R_{DF}-R_{DR}) \leq 1.0 \tag{16"}$$

It is good enough that the lens group C having positive power and the lens group D consisting of a meniscus lens having a convex surface directed toward the image side in which the mutual distance is variable be arranged at the image side of the lens group B. When refracting power of the lens group C is positive, astigmatism can be corrected well by arranging a meniscus lens having a convex surface directed toward the image side in the lens group D. Since difference of radii of curvature of two surfaces in the meniscus lens having a convex surface directed toward the image side is small, it may become a positive lens, or it may become a negative lens.

In this case, it is desired that the lens group C consists of a positive lens only.

Here, correction of distortion by image processing will be explained in detail.

It is assumed that image forming of an object at the infinite distance is carried out by an optical system which does not have distortion. In this case, since there is no distortion in the image where image forming is carried out, the following condition (17) can be formed.

$$f = y/\tan \omega \quad (17)$$

here, y is a height from the optical axis of an image point, f is a focal length of an imaging forming system, ω is an angle to the optical axis in the direction of an object point corresponding to an image point connecting to the position of y from the center on an imaging surface.

On the other hand, in an optical system when barrel-type distortion is permitted only in the state near the wide angle end, the following condition (18) is formed.

$$f > y/\tan \omega \quad (18)$$

That is to say, if ω and y are set a constant value, a focal length at the wide angle end can be long, accordingly correction of aberration becomes easily by such length.

In general, a lens group corresponding to the lens group A is constituted with two or more components. The reason of the constitution is for coexisting of correction of distortion and correction of astigmatism.

Contrary to this, in the zoom optical system of the present invention, generating of distortion is permitted to some extent. Namely, since it is not necessary to carry out correction of distortion and correction of astigmatism consistently, thinning of the zoom optical system can be achieved by using one lens component. Accordingly, in the imaging apparatus provided with the zoom optical system according to the present invention, an image data obtained by an electronic imaging element is processed by image processing. In this processing, the image data (shape of a picture image) is changed so that distortion of barrel type may be corrected. By such constitution mentioned above, an image data finally obtained is an image data having almost similar figure of an object. Therefore, it is good enough to output the picture image of the object to CRT or a printer by using this image data.

Here, it is desirable to adopt a zoom optical system to satisfy the following condition (19) when focusing is carried out at almost nearly infinite object point, $$0.7 < y_{07}/(fw \cdot \tan \omega_{07w}) < 0.94 \quad (19)$$

here, $y_{07}$ is expressed by $y_{07} = 0.7 y_{10}$ when a distance to the most distant point from a center (maximum image height) within an effective imaging surface of the electronic imaging element (within the surface in which photographing can be performed) is set to $y_{10}$; $\omega_{07w}$ is an angle to the optical axis of the direction of an object point corresponding to an image point connected to the position of $y_{07}$ from the center on the imaging surface at a wide angle end; and fw is a focal length of the whole zoom optical system at the wide angle end.

The condition (19) specifies an amount of barrel-type distortion at the wide angle end in zooming. If condition (19) is satisfied, a reasonable correction of astigmatism can be attained. An image which is distorted in barrel shape is converted photo-electrically by an imaging element, and it becomes an image data of distorted barrel shape. However, the image data distorted to barrel shape, processing corresponding to change of an image shape is carried out electrically by an image processing means which is a signal-processing system of an electronic imaging apparatus. By such constitution mentioned above, even if the image data finally outputted from the image processing means is reproduced on a display device, an image having almost similar to a shape of photographical subject in which distortion is corrected can be obtained.

Here, when it exceeds an upper limit of the condition (19), especially, if the value is near 1, distortion is corrected well optically. However, on the one hand, it is not desirable since correction of astigmatism becomes difficult. On the other hand, if it is less than a lower limit of the condition (19), a ratio of enlargement toward radial directions at a peripheral portion of an image becomes high too much when an image distortion owing to distortion of an optical system is corrected by the image processing means. As a result, degradation of the sharpness at the peripheral portion of the image becomes conspicuous.

It becomes easy to correct astigmatism well by satisfying the condition (19), and accordingly thinning and large aperture ratio aperture ratio (for example, brighter than F/2.8 at a wide angle end) of a zoom optical system can be coexistent. It is more desired that the following condition (19') is satisfied instead of the condition (19).

$$0.75 < y_{07}/(fw \cdot \tan \omega_{07w}) < 0.93 \quad (19')$$

Furthermore, it is much more desired that the following condition (19") is satisfied instead of the condition (19).

$$0.80 < y_{07}/(fw \cdot \tan \omega_{07w}) < 0.92 \quad (19'')$$

Hereafter, embodiments of the present invention will be explained using drawings.

The zoom optical system of the present embodiment consists of four lens groups.

In these lens groups, a first lens group consists of two lenses (two-sheet cemented lens), a second lens group consists of three lenses (a single lens, and two-sheet cemented lens), a third lens group consists of one lens, and a fourth lens group also consists of one lens. The second lens group can be constituted with four lenses (a single lens and three-sheet cemented lens). The refracting power of one lens can also be made to share with two lenses. In this case, although not shown in the embodiment, one lens can be increased at least in the one lens group of the four lens groups. In case of the maximum, the first lens group is constituted with three lenses, the second lens group is constituted with four or five lenses, the third lens group is constituted with two lenses, and the fourth group is also constituted with two lenses.

Here, the two lenses can be a cemented lens, or can be a single lens in which each of lenses is separated. (for example, the first lens group can constituted with two-sheet cemented lens and a single lens, or a three-sheet cemented lens). Thus, the zoom optical system can be constituted such that the first lens group consists of 2~3 lenses, the second lens group consists of 3~5 lenses, the third lens group consists of 1~2 lenses. They are 1~2 lenses about the fourth lens group, since the number of sheet of the lens which can be used for aberration correction increases by increasing one sheet of lens, large aperture size can be obtained in a state where aberration is corrected well. Moreover, the thickness of a lens does not increase so much since each radius of curvature of two lenses can be enlarged. Therefore, the optical system does not become large-size.

Embodiment 1

Figure 1B:
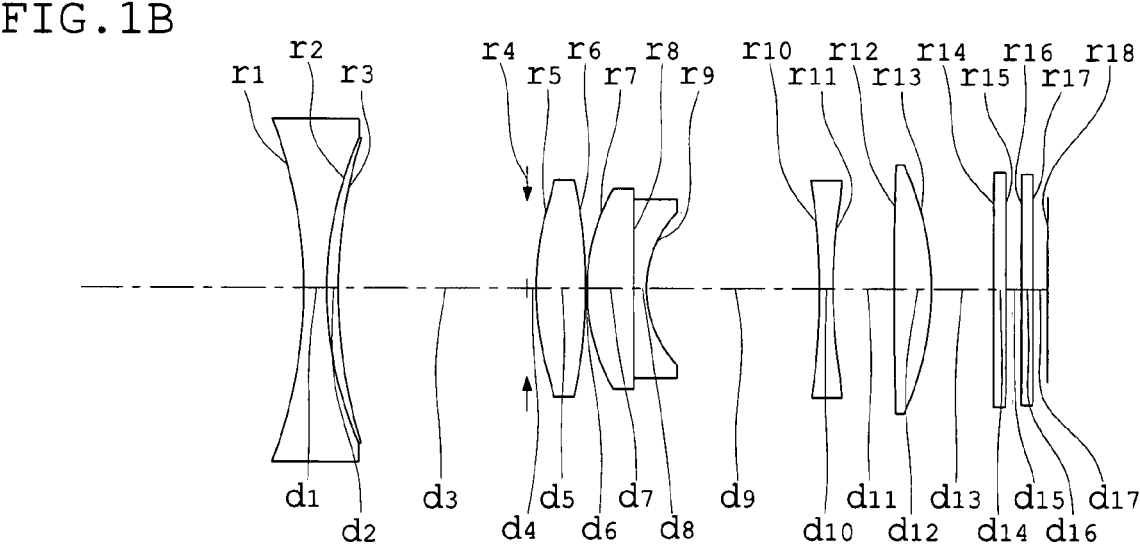
Figure 1C:
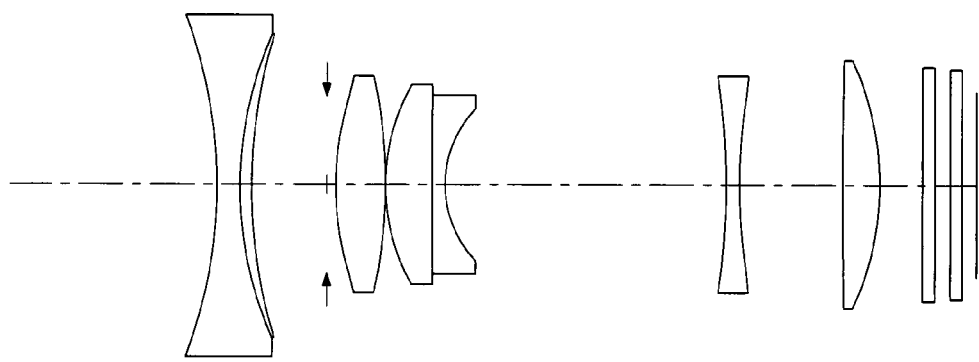

FIGS. 1A, 1B and 1C are sectional views showing an optical arrangement developed along an optical axis at a wide angle end, a middle position and a telephoto end, respectively, of the zoom lens system when focusing is carried out at the infinite object point in the first embodiment according to the present invention. FIGS. 2A-2D, 2E-2H, and 2I-2 are figures showing spherical aberration, astigmatism, distortion, and chromatic aberration of magnification, respectively, when focusing is carried out at the infinite object point of the zoom optical system of FIG. 1, and show states in the wide angle end, the middle position, and the telephoto end, respectively.

In FIG. 1, I is an imaging surface of CCD which is an electronic imaging element, S is an aperture stop, FL is a filter having a form like parallel plate, and CG is a CCD cover glass having a form like plane plate. The zoom optical system of the first embodiment is constituted by having a lens group, filter FL, cover glass CG and CCD. (it is not necessary that CCD is contained in parts constituting a zoom optical system. This is the same in other embodiments). The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a convex surface directed toward the object side are cemented lens, and it is constituted with one negative lens component as a whole. The positive meniscus lens L12 having a convex surface directed toward the object side is a lens in which an energy hardening type resin is used, and it is formed on the double concave lens L11. The second lens group G2 consists of a double convex lens L21 and a cemented lens in which a double convex lens L22 and a double concave lens L23 are cemented. The third lens group G3 consists of a double concave lens L31. The fourth lens group G4 consists of a double convex lens L41.

When magnification from a wide angle end to a telephoto end is carried out, the first lens group G1 moves to two directions along the optical axis, namely, it moves toward the image side at first, and then toward the object side, and the second lens group G2 and an aperture stop S move together simply along the optical axis toward the object side so that a distance to the first lens group G1 may be narrowed. The third lens group G3 moves to two directions along the optical axis, namely, it moves toward the image side at first, and then it moves so as to narrow a distance to the lens group 4, and then it moves toward the object side, and the fourth lens group G4 moves simply toward the image side along the optical axis.

Numerical data of the zoom optical system of the embodiment 1 are shown below.

Here, $r_1, r_2 \ldots$ represent a radius of curvature of each-lens surface; $d_1, d_2 \ldots$ represent a distance between each-lens surface; $n_{d1}, n_{d2} \ldots$ represent a refracting index of each lens at d ray; $\nu_{d1}, \nu_{d2} \ldots$ is Abbe number of each lens at d ray; F is a focal distance of the whole zoom optical system; and fno is an F number.

An aspherical surface is expressed by the following formula (8), where a direction of an optical axis is z; a direction which intersects perpendicularly to the optical axis is h; a cone coefficient is k; an aspherical coefficient is represented by $A_4, A_6, A_8$, and $A_{10}$; and a radius of curvature of spherical surface component on the optical axis is R.

$$z = h^2/R/[1+\{1-(1+k)h^2/R^2\}^{1/2}] + A_4 y^4 + A_6 y^6 + A_8 y^8 + A_{10} y^{10} \tag{8}$$

Furthermore, in the numerical data, (AP) represents an aspherical surface; (AS) represents an aperture stop; and (IM) represents a light receiving surface of a imaging element.

These symbols are common in the numerical data of embodiments to be described later.

Numerical data 1

| | | | |
|---|---|---|---|
| $r_1 = -13.2566$ (AP) | $d_1 = 0.8000$ | $n_{d1} = 1.49700$ | $\nu_{d1} = 81.54$ |
| $r_2 = 13.1877$ | $d_2 = 0.4237$ | $n_{d2} = 1.63494$ | $\nu_{d2} = 23.22$ |
| $r_3 = 20.8972$ (AP) | $d_3 = D3$ | | |
| $r_4 = \infty$ (AS) | $d_4 = 0.3000$ | | |
| $r_5 = 8.6234$ (AP) | $d_5 = 1.8201$ | $n_{d5} = 1.83481$ | $\nu_{d5} = 42.71$ |
| $r_6 = -28.1231$ (AP) | $d_6 = 0.0791$ | | |
| $r_7 = 7.0624$ (AP) | $d_7 = 1.7619$ | $n_{d7} = 1.83481$ | $\nu_{d7} = 42.71$ |
| $r_8 = -462.1726$ | $d_8 = 0.4000$ | $n_{d8} = 1.80810$ | $\nu_{d8} = 24.00$ |
| $r_9 = 3.9333$ | $d_9 = D9$ | | |
| $r_{10} = -34.2928$ (AP) | $d_{10} = 0.5000$ | $n_{d10} = 1.52542$ | $\nu_{d10} = 55.78$ |
| $r_{11} = 22.6658$ | $d_{11} = D11$ | | |
| $r_{12} = 63.7715$ (AP) | $d_{12} = 1.3800$ | $n_{d12} = 1.83481$ | $\nu_{d12} = 42.71$ |
| $r_{13} = -9.6000$ | $d_{13} = D13$ | | |
| $r_{14} = \infty$ | $d_{14} = 0.5000$ | $n_{d14} = 1.54771$ | $\nu_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $\nu_{d16} = 64.14$ |
| $r_{17} = \infty$ | $d_{17} = D17$ | | |
| $r_{18} = \infty$ (IM) | | | |

Aspherical coefficient

Surface number 1

$k = -2.8817$
$A_2 = 0$          $A_4 = 0$          $A_6 = 3.6881 \times 10^{-6}$          $A_8 = -5.5124 \times 10^{-8}$
$A_{10} = 0$

Surface number 3

$k = -2.9323$
$A_2 = 0$          $A_4 = 3.6856 \times 10^{-5}$          $A_6 = 5.0066 \times 10^{-6}$          $A_8 = -5.9251 \times 10^{-8}$
$A_{10} = 0$ -continued Numerical data 1

Surface number 5 k = −1.8270
$A_2 = 0$    $A_4 = -3.4535 \times 10^{-4}$    $A_6 = -2.1823 \times 10^{-5}$    $A_8 = -7.8527 \times 10^{-8}$
$A_{10} = 0$ Surface number 6 k = −5.3587
$A_2 = 0$    $A_4 = -3.7600 \times 10^{-4}$    $A_6 = -4.8554 \times 10^{-6}$    $A_8 = -2.1415 \times 10^{-7}$
$A_{10} = 0$ Surface number 7 k = 0.1274
$A_2 = 0$    $A_4 = 8.3040 \times 10^{-5}$    $A_6 = 1.9928 \times 10^{-5}$    $A_8 = 5.0707 \times 10^{-7}$
$A_{10} = 8.1677 \times 10^{-9}$ Surface number 10 k = 57.7596
$A_2 = 0$    $A_4 = -1.7412 \times 10^{-4}$    $A_6 = -4.6146 \times 10^{-6}$    $A_8 = 1.1872 \times 10^{-6}$
$A_{10} = 0$ Surface number 12 k = 0
$A_2 = 0$    $A_4 = -4.1049 \times 10^{-4}$    $A_6 = 3.1634 \times 10^{-6}$    $A_8 = 0$
$A_{10} = 0$ Refractive index of component of the negative lens $L_{AN}$ according to wavelength nd = 1.496999    nC = 1.495136    nF = 1.501231    ng = 1.504507    nh = 1.507205

Refractive index of component of the positive lens $L_{AP}$ according to wavelength nd = 1.634937    nC = 1.627308    nF = 1.654649    ng = 1.673790    nh = 1.692286

Zoom data(D0 (distance from an object to the first surface) is infinity)

|     | wide angle end | middle position | telephoto end |
| --- | --- | --- | --- |
| F   | 6.42002  | 11.01031 | 18.48954 |
| fno | 1.8604   | 2.4534   | 3.4040   |
| D0  | ∞        | ∞        | ∞        |
| D3  | 14.77955 | 7.26463  | 2.92947  |
| D9  | 2.20000  | 6.46215  | 10.54460 |
| D11 | 2.38783  | 2.27230  | 3.76136  |
| D13 | 3.16783  | 2.30230  | 1.60000  |
| D17 | 0.50018  | 0.50009  | 0.50003  |

Embodiment 2

Figure 3A:
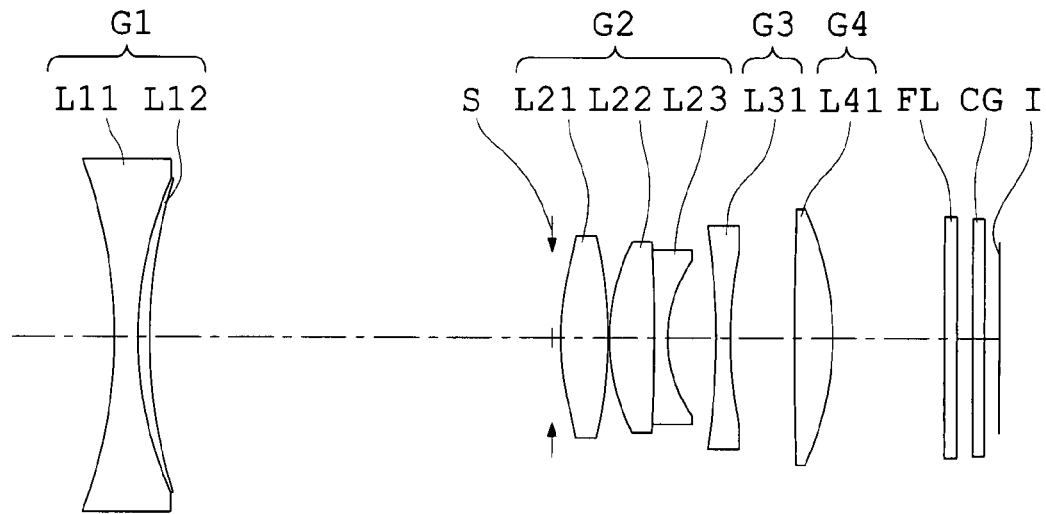
FIGS. 3A, 3B and 3C are sectional views showing an optical arrangement developed along an optical axis at a wide angle end, a middle position and a telephoto end respectively of the zoom lens system when focusing is carried out at the infinite object point in an embodiment 2 according to the present invention.
Figure 3B:
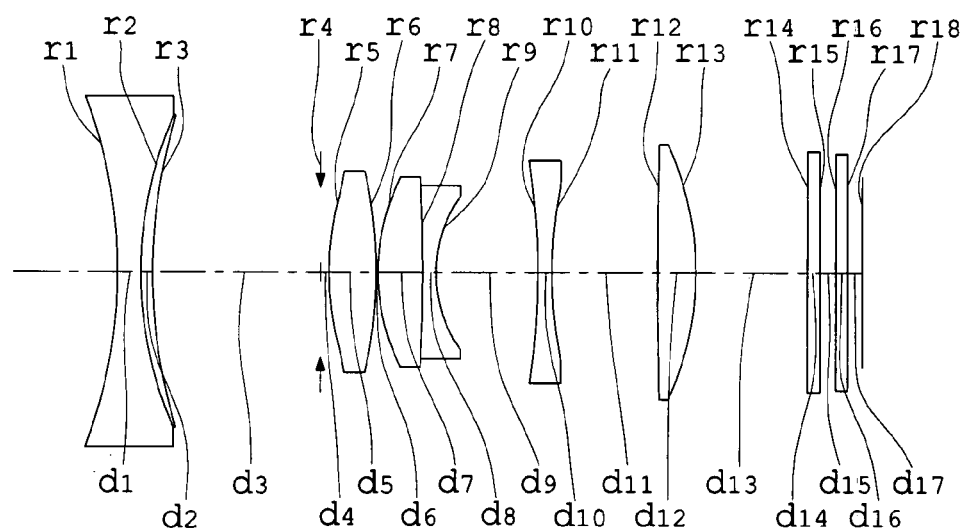
Figure 3C:
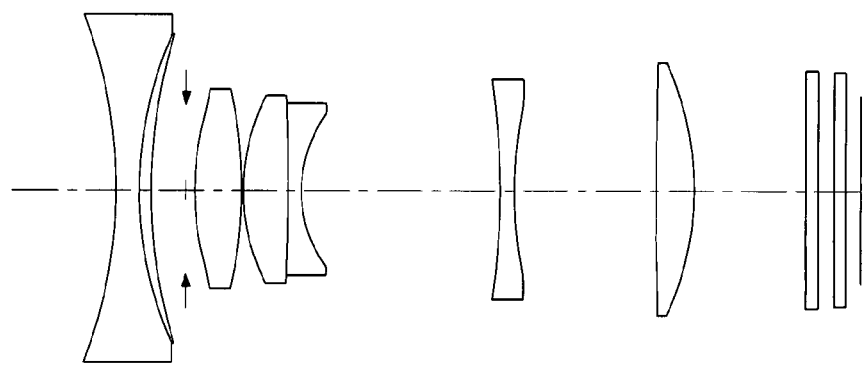
Figure 4A:
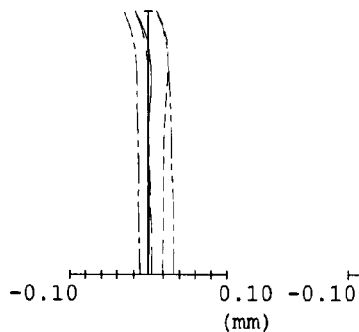
FIGS. 4A~4D, 4E~4H, and 4I~4L are figures showing spherical aberration, astigmatism, distortion, distortion, distortion, and chromatic aberration of magnification respectively, when focusing is carried out at the infinite object point of the zoom optical system of FIG. 3, and show states in the wide angle end, the middle position, and the telephoto end, respectively.
Figure 4B:
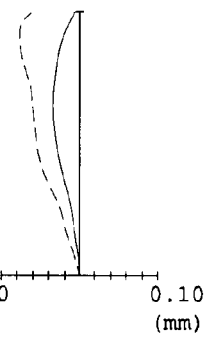
Figure 4C:
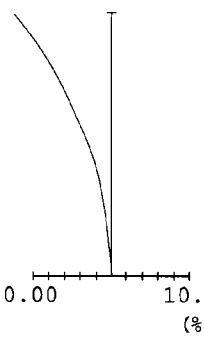
Figure 4D:
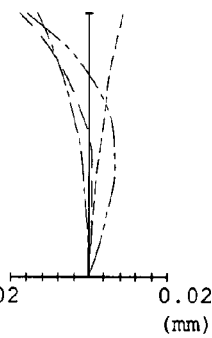
Figure 4E:
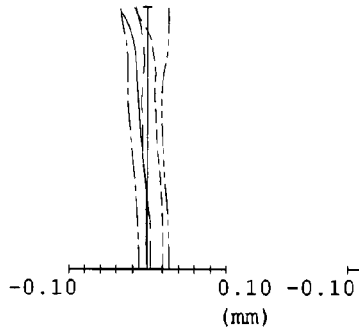
Figure 4F:
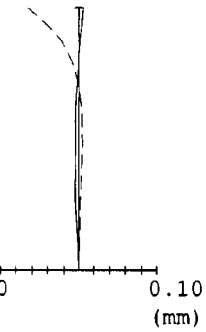
Figure 4G:
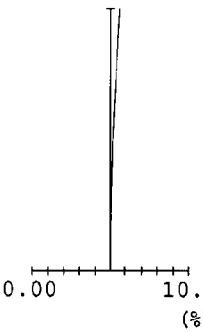
Figure 4H:
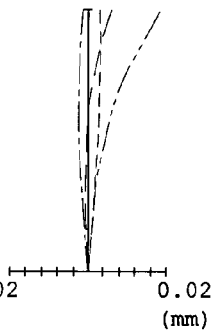
Figure 4I:
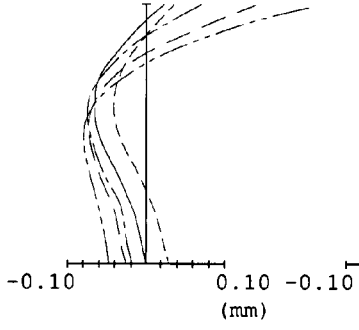
Figure 4J:
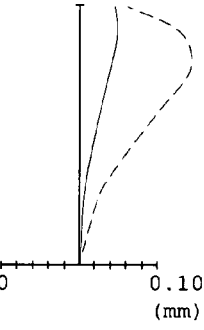
Figure 4K:
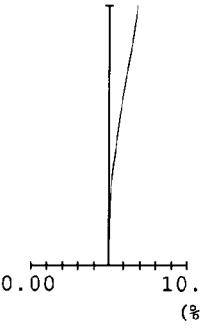
Figure 4L:
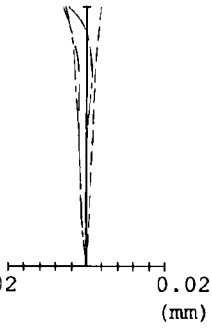

FIGS. 3A, 3B and 3C are sectional views showing an optical arrangement developed along an optical axis at a wide angle end, a middle position and a telephoto end respectively of the zoom lens system when focusing is carried out at the infinite object point in an embodiment 2 according to the present invention. FIGS. 4A~4D, 4E~4H, and 4I~4L are figures showing spherical aberration, astigmatism, distortion, and chromatic aberration of magnification respectively, when focusing is carried out at the infinite object point of the zoom optical system of FIG. 3, and show states in the wide angle end, the middle position, and the telephoto end, respectively.

In FIG. 3, I is an imaging surface of CCD which is an electronic imaging element, S is an aperture stop, FL is a filter having a form like parallel plate, and CG is a CCD cover glass having a form like plane plate. The zoom optical system of the embodiment 2 is constituted by having a lens group, filter FL, cover glass CG and CCD.

The zoom optical system of the embodiment 2 is constituted by having a lens group, filter FL, cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a convex surface directed toward the object side are cemented lens, and it is constituted with one negative lens component as a whole. The positive meniscus lens L12 having a convex surface directed toward the object side is a lens in which an energy hardening type resin is used, and it is formed on the double concave lens L11. The second lens group G2 consists of a double convex lens L21, and a cemented lens in which a double convex lens L22 and a double concave lens L23 are cemented. The third lens group G3 consists of a double concave lens L31. The fourth lens group G4 consists of a double convex lens L41.

When magnification from a wide angle end to a telephoto end is carried out, the first lens group G1 moves to two directions along the optical axis, namely, it moves toward an image side at first, and then toward an object side, and the second lens group G2 and an aperture stop S move together simply along the optical axis toward the object side so that a distance to the first lens group G1 may be narrowed. The third lens group G3 moves simply along the optical axis toward an the object side so that a distance to the fourth lens group G4 may be enlarged, and the fourth lens group G4 moves to two directions along the optical axis, namely, it moves toward the object side at first, and then toward the image side.

Numerical data of the zoom optical system of the second embodiment are shown below.

Numerical data 2

| | | | |
|---|---|---|---|
| $r_1 = -14.6626$ (AP) | $d_1 = 0.8000$ | $n_{d1} = 1.58313$ | $\nu_{d1} = 59.38$ |
| $r_2 = 13.6376$ | $d_2 = 0.3515$ | $n_{d2} = 1.70999$ | $\nu_{d2} = 15.00$ |
| $r_3 = 23.8797$ (AP) | $d_3 = D3$ | | |
| $r_4 = \infty$ (AS) | $d_4 = 0.3000$ | | |
| $r_5 = 8.4853$ (AP) | $d_5 = 1.7330$ | $n_{d5} = 1.83481$ | $\nu_{d5} = 42.71$ |
| $r_6 = -18.3330$ (AP) | $d_6 = 0.0791$ | | |
| $r_7 = 8.2088$ (AP) | $d_7 = 1.5797$ | $n_{d7} = 1.83481$ | $\nu_{d7} = 42.71$ |
| $r_8 = -63.5592$ | $d_8 = 0.4000$ | $n_{d8} = 1.80810$ | $\nu_{d8} = 23.00$ |
| $r_9 = 4.3771$ | $d_9 = D9$ | | |
| $r_{10} = -53.5288$ (AP) | $d_{10} = 0.5000$ | $n_{d10} = 1.85628$ | $\nu_{d10} = 20.67$ |
| $r_{11} = 15.5000$ | $d_{11} = D11$ | | |
| $r_{12} = 108.2217$ (AP) | $d_{12} = 1.3800$ | $n_{d12} = 1.90000$ | $\nu_{d12} = 27.00$ |
| $r_{13} = -9.6000$ | $d_{13} = D13$ | | |
| $r_{14} = \infty$ | $d_{14} = 0.5000$ | $n_{d14} = 1.54771$ | $\nu_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $\nu_{d16} = 64.14$ |
| $r_{17} = \infty$ | $d_{17} = D17$ | | |
| $r_{18} = \infty$ (IM) | | | |

Aspherical coefficient

Surface number 1

$k = -10.2252$
$A_2 = 0$    $A_4 = 0$    $A_6 = 3.2236 \times 10^{-6}$    $A_8 = -5.3588 \times 10^{-8}$
$A_{10} = 0$

Surface number 3

$k = 3.8529$
$A_2 = 0$    $A_4 = 1.8071 \times 10^{-4}$    $A_6 = 3.8543 \times 10^{-6}$    $A_8 = -6.1982 \times 10^{-8}$
$A_{10} = 0$

Surface number 5

$k = -2.4081$
$A_2 = 0$    $A_4 = -4.2584 \times 10^{-4}$    $A_6 = -2.8865 \times 10^{-5}$    $A_8 = -1.0370 \times 10^{-6}$
$A_{10} = 0$

Surface number 6

$k = -5.4692$
$A_2 = 0$    $A_4 = -4.0486 \times 10^{-4}$    $A_6 = -1.6488 \times 10^{-5}$    $A_8 = -6.8729 \times 10^{-7}$
$A_{10} = 0$

Surface number 7

$k = 0.3254$
$A_2 = 0$    $A_4 = 1.8098 \times 10^{-4}$    $A_6 = 1.9304 \times 10^{-5}$    $A_8 = 5.1165 \times 10^{-7}$
$A_{10} = 4.3288 \times 10^{-8}$

Surface number 10

$k = 0$
$A_2 = 0$    $A_4 = -3.6619 \times 10^{-4}$    $A_6 = -1.7580 \times 10^{-5}$    $A_8 = -1.2817 \times 10^{-7}$
$A_{10} = 0$

Surface number 12

$k = 0$
$A_2 = 0$    $A_4 = -2.5932 \times 10^{-4}$    $A_6 = 4.3267 \times 10^{-6}$    $A_8 = 0$
$A_{10} = 0$

Refractive index of component of the negative lens $L_{AN}$ according to wavelength $nd = 1.583126$    $nC = 1.580139$    $nF = 1.589960$    $ng = 1.595297$    $nh = 1.599721$

Refractive index of component of the positive lens $L_{AP}$ according to wavelength $nd = 1.709995$    $nC = 1.697485$    $nF = 1.744813$    $ng = 1.781729$    $nh = 1.820349$

Zoom data (D0 (distance from an object to the first surface) is infinity)

| wide angle end | middle position | telephoto end |
|---|---|---|

-continued

| Numerical data 2 | | | |
|---|---|---|---|
| F | 6.41984 | 11.01046 | 18.48745 |
| Fno | 2.1308 | 2.6883 | 3.5779 |
| D0 | ∞ | ∞ | ∞ |
| D3 | 14.77590 | 6.40215 | 1.62729 |
| D9 | 1.77131 | 3.83488 | 7.44342 |
| D11 | 2.34515 | 3.70635 | 5.10940 |
| D13 | 3.98433 | 4.12060 | 4.02033 |
| D17 | 0.49902 | 0.50111 | 0.50375 |

Embodiment 3

Figure 5A:
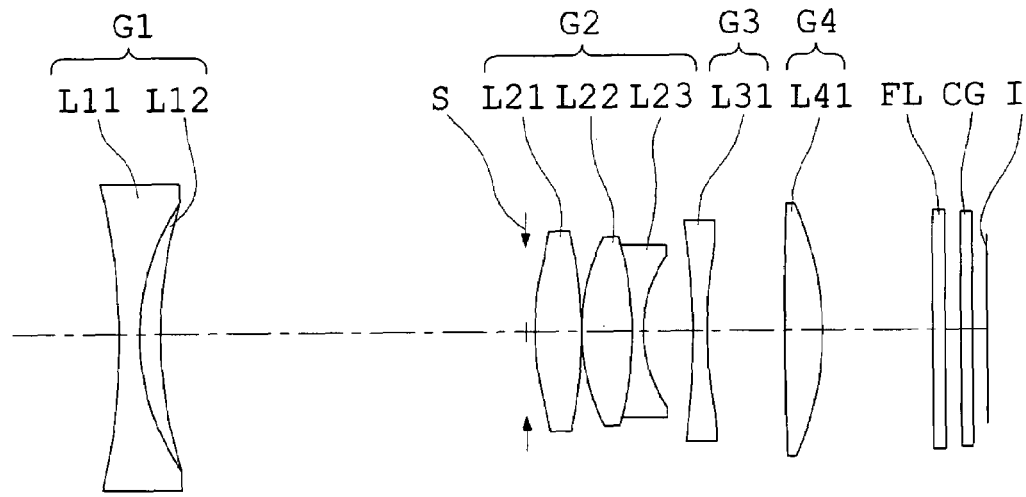
FIGS. 5A, 5B and 5C are sectional views showing an optical arrangement developed along an optical axis at a wide angle end, a middle position and a telephoto end respectively of the zoom lens system when focusing is carried out at the infinite object point in an embodiment 3 according to the present invention.
Figure 5B:
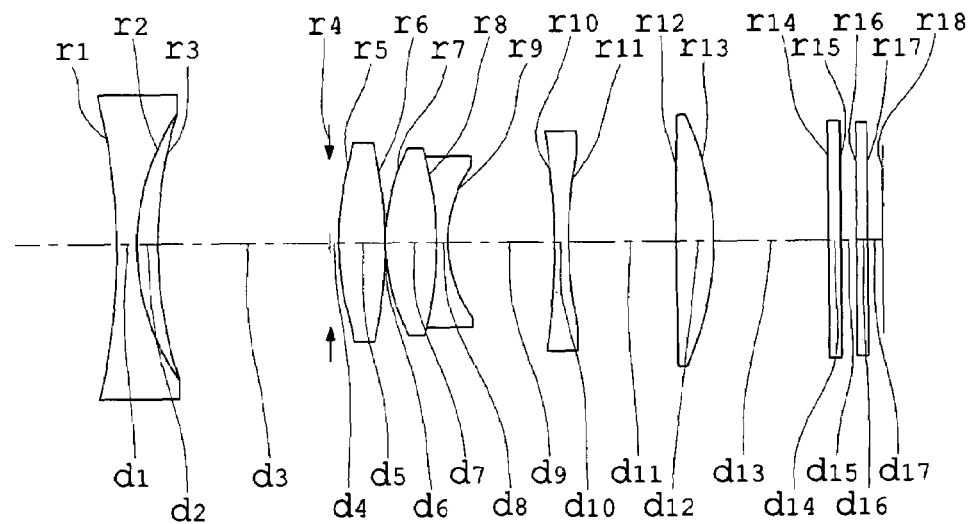
Figure 5C:
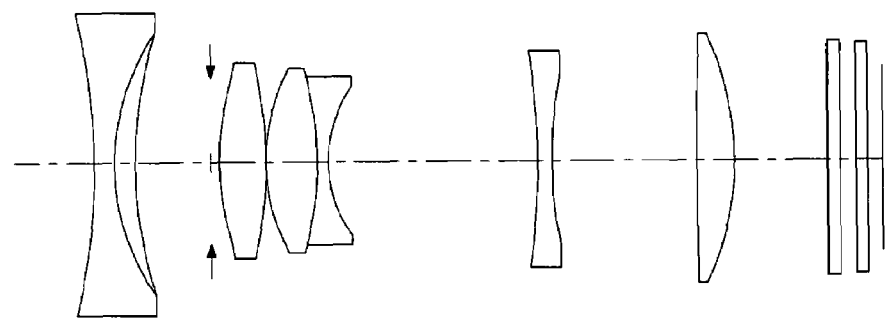

FIGS. 5A, 5B and 5C are sectional views showing an optical arrangement developed along an optical axis at a wide angle end, a middle position and a telephoto end respectively of the zoom lens system when focusing is carried out at the infinite object point in an embodiment 3 according to the present invention. FIGS. 6A~6D, 6E~6H, and 6I~6L are figures showing spherical aberration, astigmatism, distortion, and chromatic aberration of magnification respectively, when focusing is carried out at the infinite object point of the zoom optical system of FIG. 5, and show states in the wide angle end, the middle position, and the telephoto end, respectively. In FIG. 5, I is an imaging surface of CCD which is an electronic imaging element, S is an aperture stop, FL is a filter having a form like parallel plate, and CG is a CCD cover glass having a form like plane plate.

In the zoom optical system of the embodiment 3, the zoom optical system of the embodiment 3 is constituted by having a lens group, a filter FL, a cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D. The first lens group G1 consists of a cemented lens in which a double concave lens L11 and a positive meniscus lens L12 having a convex surface directed toward the object side are cemented, and it is constituted with one negative lens component as a whole. The positive meniscus lens L12 having convex surface directed toward the object side is a lens in which an energy hardening type resin is used, and it is formed on the double concave lens L11. The second lens group G2 consists of a double convex lens L21, and a cemented lens in which a double convex lens L22 and a double concave lens L23. The third lens group G3 consists of a double concave lens L31. The fourth lens group G4 consists of a double convex lens L41.

When magnification from a wide angle end to a telephoto end is carried out, the first lens group G1 moves to two directions along the optical axis, namely, it moves toward an image side at first, and then it moves toward an object side along the optical axis, and the second lens group G2 and an aperture stop S move together simply along the optical axis toward an the object side so that a distance to the first lens group G1 may be narrowed. The third lens group G3 moves simply along the optical axis toward an the object side so that a distance to the fourth lens group G4 may be enlarged, and the fourth lens group G4 moves to two directions along the optical axis, namely, it moves toward an image side at first, and then toward the image side.

Numerical data of the zoom optical system of the embodiment 3 are shown below.

| Numerical data 3 | | | |
|---|---|---|---|
| $r_1 = -25.4905$ (AP) | $d_1 = 0.8000$ | $n_{d1} = 1.74320$ | $\nu_{d1} = 49.34$ |
| $r_2 = 8.2460$ | $d_2 = 0.6848$ | $n_{d2} = 1.75000$ | $\nu_{d2} = 15.00$ |
| $r_3 = 15.7873$ (AP) | $d_3 = D3$ | | |
| $r_4 = \infty$ (AS) | $d_4 = 0.3000$ | | |
| $r_5 = 7.8777$ (AP) | $d_5 = 1.8441$ | $n_{d5} = 1.83481$ | $\nu_{d5} = 42.71$ |
| $r_6 = -15.9558$ (AP) | $d_6 = 0.0791$ | | |
| $r_7 = 9.3650$ (AP) | $d_7 = 1.7013$ | $n_{d7} = 1.83481$ | $\nu_{d7} = 42.71$ |
| $r_8 = -14.1273$ | $d_8 = 0.4000$ | $n_{d8} = 1.80810$ | $\nu_{d8} = 22.76$ |
| $r_9 = 4.5576$ | $d_9 = D9$ | | |
| $r_{10} = -37.4717$ (AP) | $d_{10} = 0.5000$ | $n_{d10} = 2.00000$ | $\nu_{d10} = 25.00$ |
| $r_{11} = 15.5000$ | $d_{11} = D11$ | | |
| $r_{12} = 103.2252$ (AP) | $d_{12} = 1.3800$ | $n_{d12} = 1.92000$ | $\nu_{d12} = 22.00$ |
| $r_{13} = -9.6000$ | $d_{13} = D13$ | | |
| $r_{14} = \infty$ | $d_{14} = 0.5000$ | $n_{d14} = 1.54771$ | $\nu_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $\nu_{d16} = 64.14$ |
| $r_{17} = \infty$ | $d_{17} = D17$ | | |
| $r_{18} = \infty$ (IM) | | | |

Aspherical coefficient

Surface number 1

$k = 0.6227$
$A_2 = 0$ $A_4 = 0$ $A_6 = 3.3561 \times 10^{-6}$ $A_8 = -1.5540 \times 10^{-9}$
$A_{10} = 0$ -continued Numerical data 3

Surface number 3 k = −0.5547
$A_2 = 0$
$A_{10} = 0$
$A_4 = -9.9336 \times 10^{-6}$    $A_6 = 6.6953 \times 10^{-6}$    $A_8 = 9.6741 \times 10^{-8}$ Surface number 5 k = −1.8589
$A_2 = 0$
$A_{10} = 0$
$A_4 = -3.2115 \times 10^{-4}$    $A_6 = -2.1569 \times 10^{-5}$    $A_8 = -9.0860 \times 10^{-7}$ Surface number 6 k = −8.6329
$A_2 = 0$
$A_{10} = 0$
$A_4 = -3.5000 \times 10^{-4}$    $A_6 = -9.1033 \times 10^{-6}$    $A_8 = -7.6128 \times 10^{-7}$ Surface number 7 k = 0.1074
$A_2 = 0$
$A_{10} = 4.1284 \times 10^{-9}$
$A_4 = 1.4490 \times 10^{-4}$    $A_6 = 1.5895 \times 10^{-5}$    $A_8 = 7.9815 \times 10^{-7}$ Surface number 10 k = 0
$A_2 = 0$
$A_{10} = 0$
$A_4 = -4.3432 \times 10^{-4}$    $A_6 = -3.9156 \times 10^{-5}$    $A_8 = 1.3010 \times 10^{-6}$ Surface number 12 k = 0
$A_2 = 0$
$A_{10} = 0$
$A_4 = -2.1377 \times 10^{-4}$    $A_6 = 2.2393 \times 10^{-6}$    $A_8 = 0$ Refractive index of component of the negative lens $L_{AN}$ according to wavelength nd = 1.743198    nC = 1.738653    nF = 1.753716    ng = 1.762047    nh = 1.769040

Refractive index of component of the positive lens $L_{AP}$ according to wavelength nd = 1.749995    nC = 1.736707    nF = 1.786700    ng = 1.822303    nh = 1.857180

Zoom data(D0 (distance from an object to the first surface) is infinity)

|  | wide angle end | middle position | telephoto end |
|---|---|---|---|
| F | 6.41996 | 11.01015 | 18.48954 |
| Fno | 2.3074 | 2.9164 | 3.9965 |
| D0 | ∞ | ∞ | ∞ |
| D3 | 13.62838 | 6.55176 | 2.97274 |
| D9 | 1.84065 | 4.01071 | 7.85352 |
| D11 | 2.85247 | 3.85195 | 5.22392 |
| D13 | 3.98922 | 4.31057 | 3.46097 |
| D17 | 0.50005 | 0.49998 | 0.49996 |

Embodiment 4

Figure 7A:
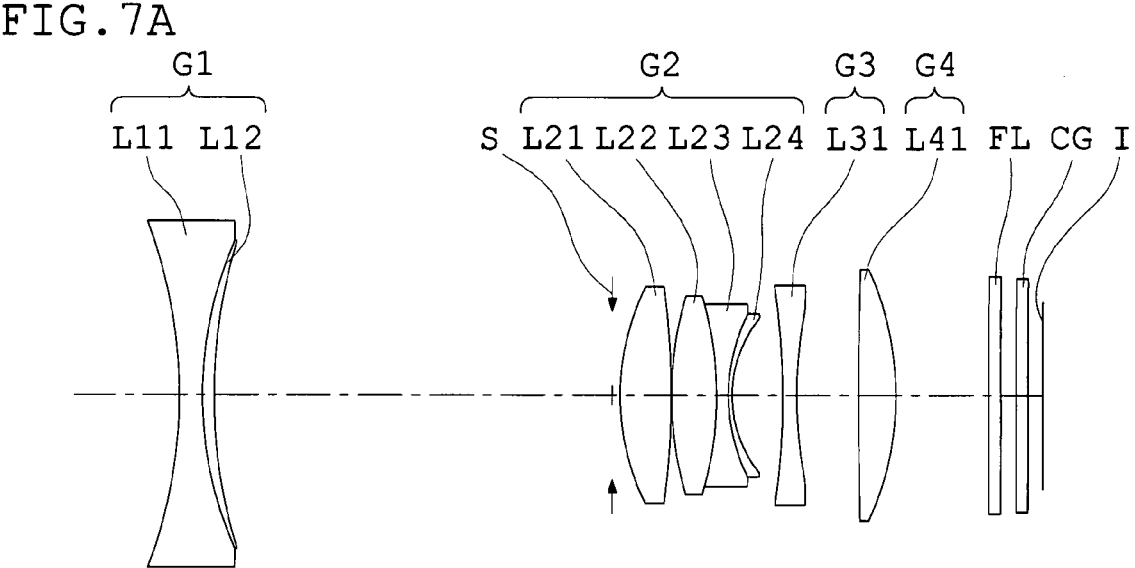
FIGS. 7A, 7B and 7C are sectional views showing an optical arrangement developed along an optical axis at a wide angle end, a middle position and a telephoto end respectively of the zoom lens system when focusing is carried out at the infinite object point in an embodiment 4 according to the present invention.
Figure 7B:
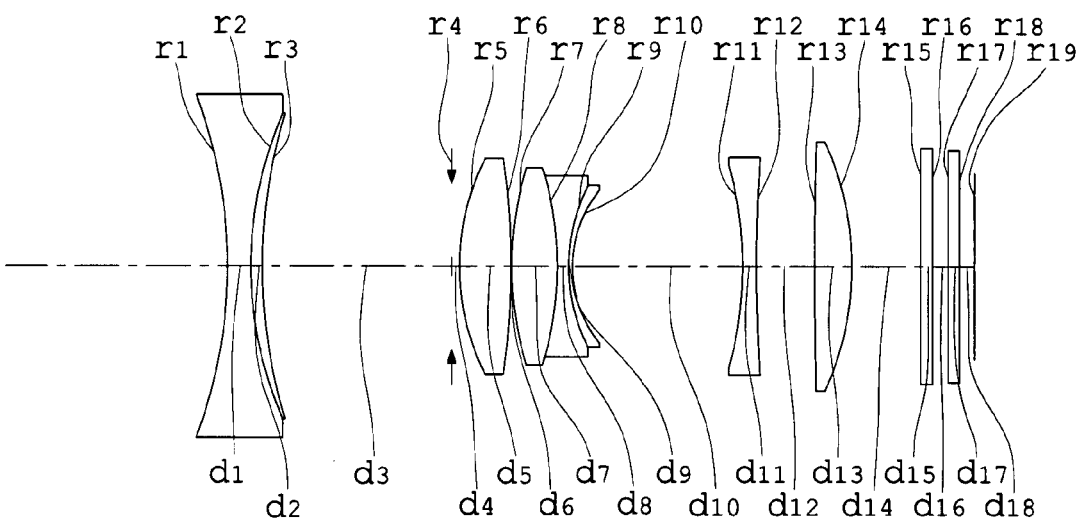
Figure 7C:
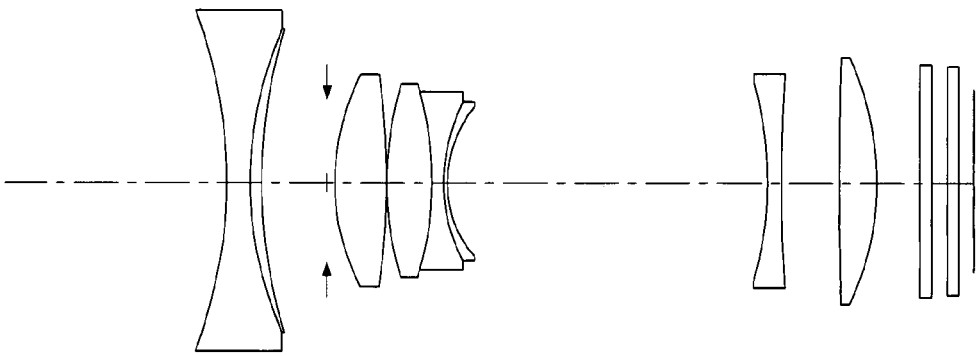
Figures 8A, 8B, 8C, 8D:
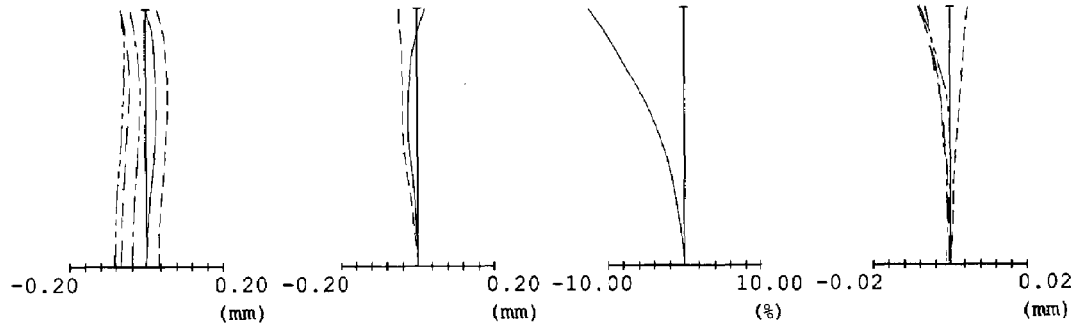
FIGS. 8A~8D, 8E~8H, and 8I~8L are figures showing spherical aberration, astigmatism, distortion, and chromatic aberration of magnification respectively when focusing is carried out at the infinite object point of the zoom optical system of FIG. 7, and show states in the wide angle end, the middle position, and the telephoto end, respectively.
Figures 8E, 8F, 8G, 8H:
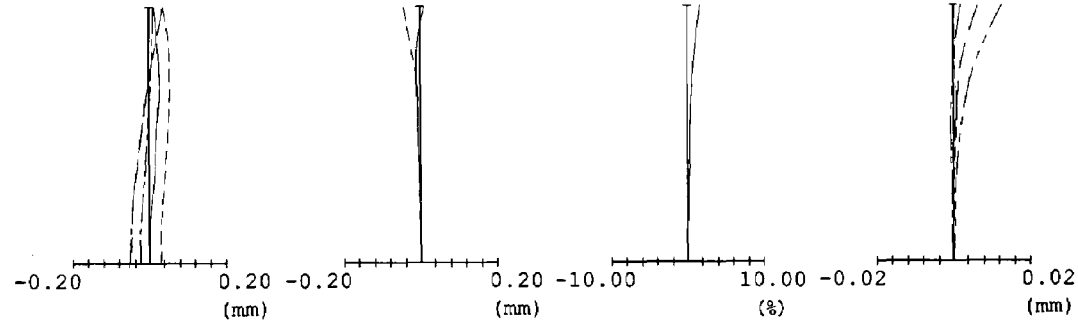
Figures 8I, 8J, 8K, 8L:
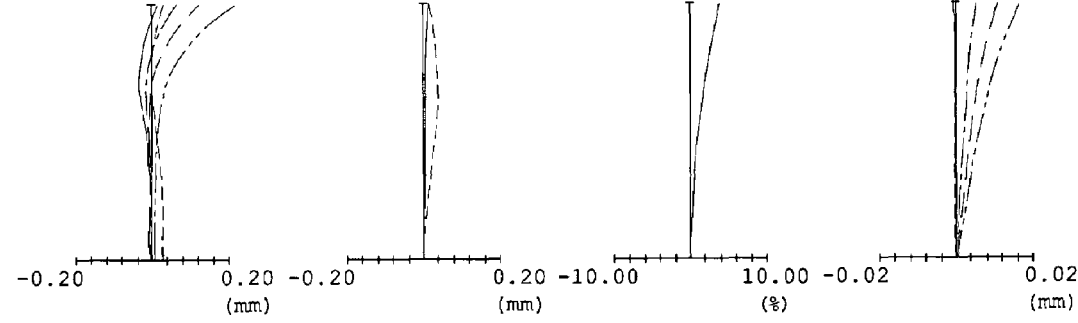

FIGS. 7A, 7B and 7C are sectional views showing an optical arrangement developed along an optical axis at a wide angle end, a middle position and a telephoto end respectively of the zoom lens system when focusing is carried out at the infinite object point in an embodiment 4 according to the present invention. FIGS. 8A~8D, 8E~8H, and 8I~8L are figures showing spherical aberration, astigmatism, and magnification chromatic aberration respectively, when focusing is carried out at the infinite object point of the zoom optical system of FIG. 7, and show states in the wide angle end, the middle position, and the telephoto end, respectively.

In FIG. 7, I is an imaging surface of CCD which is an electronic imaging element, S is an aperture stop, FL is a filter having a form like parallel plate, and CG is a CCD cover glass having a form like plane plate.

The zoom optical system of the embodiment 4 is constituted by having a lens group, a filter FL, a cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a convex surface directed toward the object side are cemented, and it is constituted with one negative lens component as a whole. The positive meniscus lens L12 having a convex surface directed toward the object side is a lens which an energy hardening type resin is used, and it is formed on the double concave lens L11. The second lens group G2 consists of a double convex lens L21, and a cemented lens in which a double convex lens L22, a double concave lens L23, and a negative meniscus lens L24 having a convex surface directed toward the object side. The third lens group G3 consists of a double concave lens L31. The fourth lens group G4 consists of a double convex lens L41.

When magnification from a wide angle end to a telephoto end is carried out, the first lens group G1 moves to two directions along the optical axis, namely, it moves toward an image side at first, and then it moves toward an object side along the optical axis, and the second lens group G2 and an aperture stop S move together simply along the optical axis toward an the object side so that a distance to the first lens group G1 may be narrowed. The third lens group G3 moves simply toward the image side along the optical axis. The fourth lens group G4 moves toward the image side so that a distance to the third lens group G3 may be kept constant.

Numerical data of the zoom optical system of the fourth embodiment are shown below.

Numerical data 4

| | | | |
|---|---|---|---|
| $r_1 = -12.4638$ (AP) | $d_1 = 0.8000$ | $n_{d1} = 1.49700$ | $v_{d1} = 81.54$ |
| $r_2 = 13.3687$ | $d_2 = 0.4776$ | $n_{d2} = 1.63494$ | $v_{d2} = 23.22$ |
| $r_3 = 27.4986$ (AP) | $d_3 = D3$ | | |
| $r_4 = \infty$ (As) | $d_4 = 0.3000$ | | |
| $r_5 = 7.4744$ (AP) | $d_5 = 1.9063$ | $n_{d5} = 1.83481$ | $v_{d5} = 42.71$ |
| $r_6 = -21.4110$ (AP) | $d_6 = 0.0791$ | | |
| $r_7 = 11.1522$ | $d_7 = 1.7145$ | $n_{d7} = 1.81600$ | $v_{d7} = 46.62$ |
| $r_8 = -11.6979$ | $d_8 = 0.4000$ | $n_{d8} = 1.76182$ | $v_{d8} = 26.52$ |
| $r_9 = 6.0000$ | $d_9 = 0.1000$ | $n_{d9} = 1.63494$ | $v_{d9} = 23.22$ |
| $r_{10} = 3.7931$ (AP) | $d_{10} = D10$ | | |
| $r_{11} = -18.5300$ (AP) | $d_{11} = 0.5000$ | $n_{d11} = 1.49700$ | $v_{d11} = 81.54$ |
| $r_{12} = 43.8425$ | $d_{12} = D12$ | | |
| $r_{13} = 49.7881$ (AP) | $d_{13} = 1.5213$ | $n_{d13} = 1.83481$ | $v_{d13} = 42.71$ |
| $r_{14} = -9.3000$ | $d_{14} = D14$ | | |
| $r_{15} = \infty$ | $d_{15} = 0.5000$ | $n_{d15} = 1.54771$ | $v_{d15} = 62.84$ |
| $r_{16} = \infty$ | $d_{16} = 0.5000$ | | |
| $r_{17} = \infty$ | $d_{17} = 0.5000$ | $n_{d17} = 1.51633$ | $v_{d17} = 64.14$ |
| $r_{18} = \infty$ | $d_{18} = D18$ | | |
| $r_{19} = \infty$ (IM) | | | |

Aspherical coefficient

Surface number 1

$k = -6.4093$
$A_2 = 0$    $A_4 = 0$    $A_6 = 1.6769 \times 10^{-6}$    $A_8 = -2.3120 \times 10^{-8}$
$A_{10} = 0$ Surface number 3

$k = -2.4919$
$A_2 = 0$    $A_4 = 1.9423 \times 10^{-4}$    $A_6 = 1.8515 \times 10^{-6}$    $A_8 = -3.3639 \times 10^{-8}$
$A_{10} = 0$ Surface number 5

$k = -0.9686$
$A_2 = 0$    $A_4 = -3.9412 \times 10^{-5}$    $A_6 = 0$    $A_8 = 0$
$A_{10} = 0$ Surface number 6

$k = -70.1334$
$A_2 = 0$    $A_4 = 1.1578 \times 10^{-5}$    $A_6 = 0$    $A_8 = 0$
$A_{10} = 0$ Surface number 10

$k = 0$
$A_2 = 0$    $A_4 = -2.1909 \times 10^{-3}$    $A_6 = 8.0659 \times 10^{-5}$    $A_8 = -9.4134 \times 10^{-6}$
$A_{10} = 0$ Surface number 11

$k = 0$
$A_2 = 0$    $A_4 = -5.4322 \times 10^{-4}$    $A_6 = 1.0884 \times 10^{-5}$    $A_8 = 0$
$A_{10} = 0$ Surface number 13

$k = 0$
$A_2 = 0$    $A_4 = -3.4682 \times 10^{-4}$    $A_6 = 0$    $A_8 = 0$
$A_{10} = 0$ Refractive index of component of the negative lens $L_{AN}$ according to wavelength

| nd = 1.496999 | nC = 1.495136 | nF = 1.501231 | ng = 1.504507 | nh = 1.507205 |

Refractive index of component of the positive lens $L_{AP}$ according to wavelength

| nd = 1.634940 | nC = 1.627290 | nF = 1.654640 | ng = 1.672913 | nh = 1.689873 |

-continued

Numerical data 4

Zoom data(D0 (distance from an object to the first surface) is infinity)

|  | wide angle end | middle position | telephoto end |
|---|---|---|---|
| F | 6.42000 | 11.01030 | 18.48960 |
| Fno | 1.8487 | 2.4557 | 3.3920 |
| D0 | ∞ | ∞ | ∞ |
| D3 | 14.82390 | 7.08722 | 2.38201 |
| D10 | 1.92800 | 6.27359 | 11.86067 |
| D12 | 2.07054 | 2.07054 | 2.07054 |
| D14 | 3.37860 | 2.55161 | 1.60000 |
| D18 | 0.50009 | 0.50001 | 0.49964 |

Embodiment 5

Figure 9A:
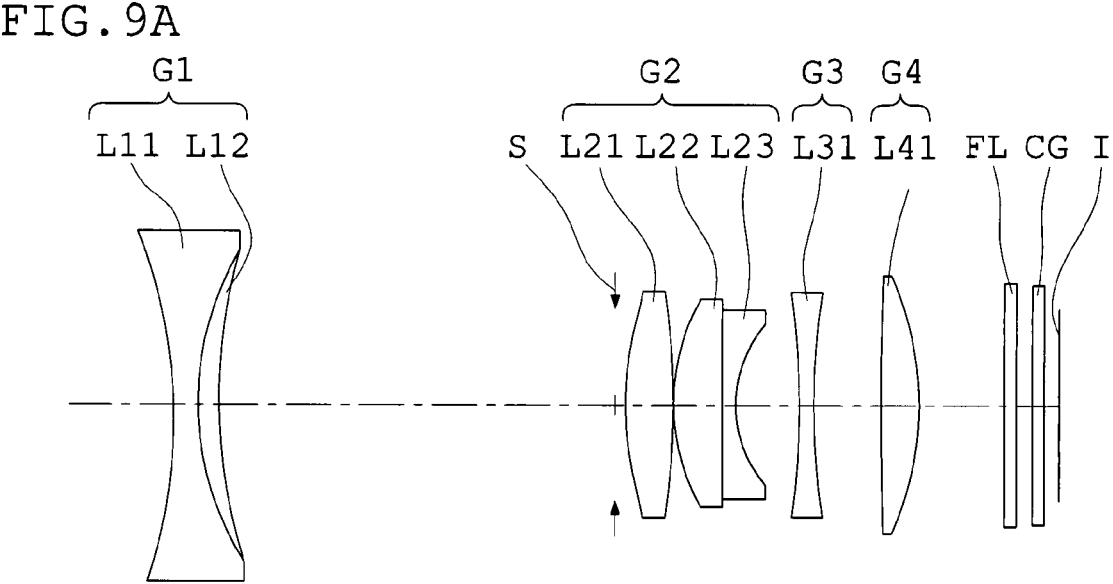
FIGS. 9A, 9B and 9C are sectional views showing an optical arrangement developed along an optical axis at a wide angle end, a middle position and a telephoto end respectively of the zoom lens system when focusing is carried out at the infinite object point in an embodiment 5 according to the present invention.
Figure 9B:
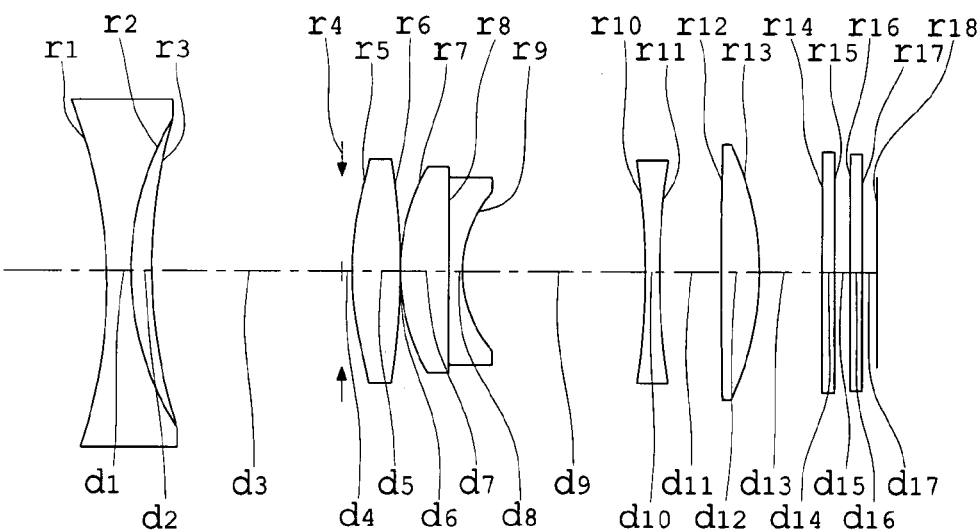
Figure 9C:
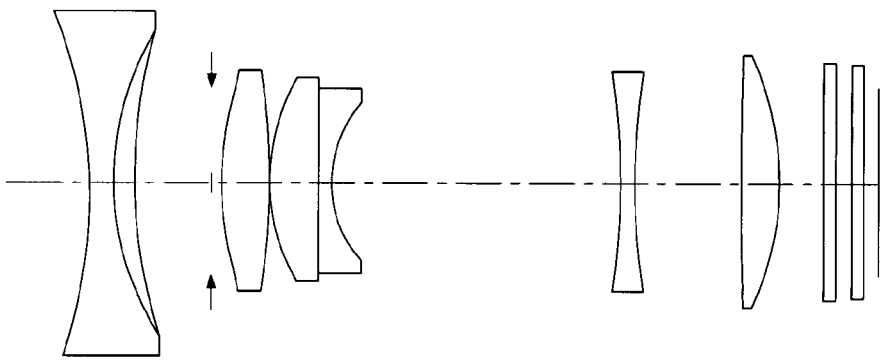

FIGS. 9A, 9B and 9C are sectional views showing an optical arrangement developed along an optical axis at a wide angle end, a middle position and a telephoto end respectively of the zoom lens system when focusing is carried out at the infinite object point in an embodiment 5 according to the present invention. FIGS. 10A~10D, 10E~19H, and 10I~10L are figures showing spherical aberration, astigmatism, distortion, and chromatic aberration of magnification respectively, when focusing is carried out at the infinite object point of the zoom optical system of FIG. 9, and show states in the wide angle end, the middle position, and the telephoto end respectively.

In FIG. 9, I is an imaging surface of CCD which is an electronic imaging element, S is an aperture stop, FL is a filter having a form like parallel plate, and CG is a CCD cover glass having a form like plane plate.

The zoom optical system of the embodiment 5 is constituted by having a lens group, a filter FL, a cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a convex surface directed toward the object side, are cemented lens, and it is constituted with one negative lens component as a whole. The positive meniscus lens L12 having a convex surface directed toward the object side is a lens in which an energy hardening type resin is used, and it is formed on the double concave lens L11. The second lens group G2 consists of a double convex lens L21, and a cemented lens in which a double convex lens L22 and a double concave lens L23. The third lens group G3 consists of a double concave lens L31. The fourth lens group G4 consists of a double convex lens L41.

When magnification from a wide angle end to a telephoto end is carried out, the first lens group G1 moves to two directions along the optical axis, namely, it moves toward an image side at first, and then it moves toward an object side along the optical axis, and the second lens group G2 and an aperture stop S move together simply along the optical axis toward the object side so that a distance to the first lens group G1 may be narrowed. The third lens group G3 moves to two directions along the optical axis, namely, it moves toward an image side at first, and then it moves so as to narrow a distance to the lens group 4 along the optical axis, and then it moves toward an object side along the optical axis, and the fourth lens group G4 moves simply toward the image side along the optical axis.

Next, numerical data of optical components of the zoom optical system of the embodiment 5 are shown below.

Numerical data 5

| | | | |
|---|---|---|---|
| $r_1 = -12.9570$ (AP) | $d_1 = 0.8000$ | $n_{d1} = 1.52542$ | $v_{d1} = 55.78$ |
| $r_2 = 10.4409$ | $d_2 = 0.7032$ | $n_{d2} = 1.63494$ | $v_{d2} = 23.22$ |
| $r_3 = 22.2162$ (AP) | $d_3 = D3$ | | |
| $r_4 = \infty$ (As) | $d_4 = 0.3000$ | | |
| $r_5 = 8.6298$ (AP) | $d_5 = 1.8448$ | $n_{d5} = 1.83481$ | $v_{d5} = 42.71$ |
| $r_6 = -26.5988$ (AP) | $d_6 = 0.0791$ | | |
| $r_7 = 7.1432$ (AP) | $d_7 = 1.7812$ | $n_{d7} = 1.83481$ | $v_{d7} = 42.71$ |
| $r_8 = -239.3124$ | $d_8 = 0.4000$ | $n_{d8} = 1.80810$ | $v_{d8} = 22.76$ |
| $r_9 = 3.9396$ | $d_9 = D9$ | | |
| $r_{10} = -42.3355$ (AP) | $d_{10} = 0.5000$ | $n_{d10} = 1.52542$ | $v_{d10} = 55.78$ |
| $r_{11} = 19.6055$ | $d_{11} = D11$ | | |
| $r_{12} = 64.2346$ (AP) | $d_{12} = 1.3800$ | $n_{d12} = 1.83481$ | $v_{d12} = 42.71$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = D17$ | | |
| $r_{18} = \infty$ (IM) | | | |

-continued

Numerical data 5

Aspherical coefficient

Surface number 1

$k = -3.9537$
$A_2 = 0$       $A_4 = 0$       $A_6 = 2.4737 \times 10^{-6}$       $A_8 = -3.9226 \times 10^{-8}$
$A_{10} = 0$

Surface number 3

$k = -0.9087$
$A_2 = 0$       $A_4 = 7.1688 \times 10^{-5}$       $A_6 = 3.7777 \times 10^{-6}$       $A_8 = -4.9770 \times 10^{-8}$
$A_{10} = 0$

Surface number 5

$k = -1.9337$
$A_2 = 0$       $A_4 = -3.4869 \times 10^{-4}$       $A_6 = -2.2526 \times 10^{-5}$       $A_8 = -5.7283 \times 10^{-8}$
$A_{10} = 0$

Surface number 6

$k = -5.9352$
$A_2 = 0$       $A_4 = -3.7375 \times 10^{-4}$       $A_6 = -6.1314 \times 10^{-6}$       $A_8 = -1.7507 \times 10^{-7}$
$A_{10} = 0$

Surface number 7

$k = 0.2051$
$A_2 = 0$       $A_4 = 8.5095 \times 10^{-5}$       $A_6 = 1.8765 \times 10^{-5}$       $A_8 = 4.8202 \times 10^{-7}$
$A_{10} = 1.0705 \times 10^{-8}$

Surface number 10

$k = 43.0913$
$A_2 = 0$       $A_4 = -2.6920 \times 10^{-4}$       $A_6 = -1.0679 \times 10^{-5}$       $A_8 = 1.0544 \times 10^{-6}$
$A_{10} = 0$

Surface number 12

$k = 0$
$A_2 = 0$       $A_4 = -4.1294 \times 10^{-4}$       $A_6 = 3.6637 \times 10^{-6}$       $A_8 = 0$
$A_{10} = 0$

Refractive index of component of the negative lens $L_{AN}$ according to wavelength nd = 1.525420    nC = 1.522680    nF = 1.532100    ng = 1.537050    nh = 1.540699

Refractive index of component of the positive lens $L_{AP}$ according to wavelength nd = 1.634940    nC = 1.627290    nF = 1.654640    ng = 1.672908    nh = 1.689873

Zoom data(D0 (distance from an object to the first surface) is infinity)

|     | wide angle end | middle position | telephoto end |
|-----|---------------|-----------------|---------------|
| F   | 6.42000       | 11.01030        | 18.48958      |
| Fno | 1.8685        | 2.4621          | 3.4244        |
| D0  | ∞             | ∞               | ∞             |
| D3  | 14.46707      | 7.07125         | 2.86615       |
| D9  | 2.20000       | 6.43367         | 10.48474      |
| D11 | 2.41629       | 2.29056         | 3.84331       |
| D13 | 3.12835       | 2.29609         | 1.60000       |
| D17 | 0.50012       | 0.50001         | 0.49950       |

Embodiment 6

Figure 11A:
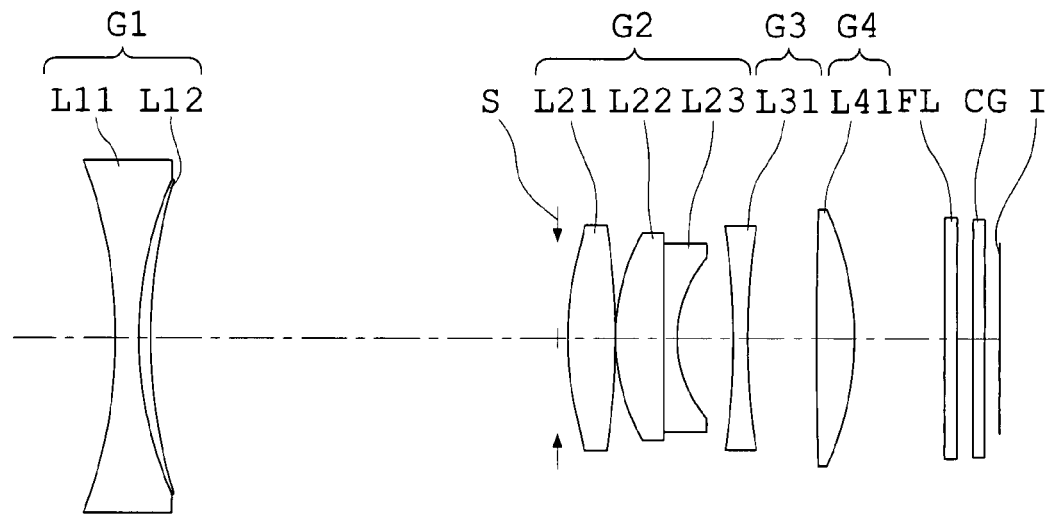
FIGS. 11A, 11B and 11C are sectional views showing an optical arrangement developed along an optical axis at a wide angle end, a middle position and a telephoto end respectively of the zoom lens system when focusing is carried out at the infinite object point in an embodiment 6 according to the present invention.
Figure 11B:
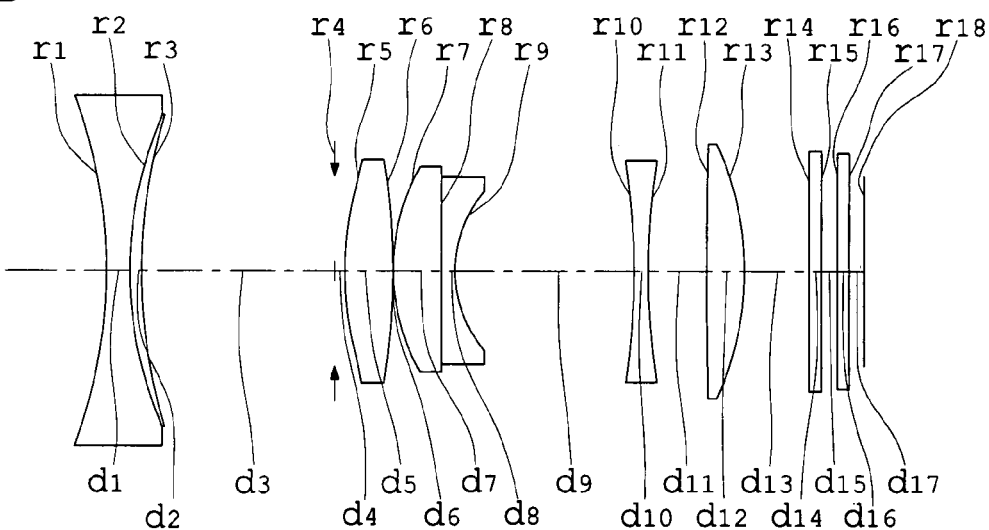

FIGS. 11A, 11B and 1117C are sectional views showing an optical arrangement developed along an optical axis at a wide angle end, a middle position and a telephoto end respectively of the zoom lens system when focusing is carried out at the infinite object point in an embodiment 6 according to the present invention. FIGS. 12A~12D, 12E~12H, and 12I~12L are figures showing spherical aberration, astigmatism, distortion, and chromatic aberration of magnification respectively, when focusing is carried out at the infinite object point of the zoom optical system of FIG. 11, and show states in the wide angle end, the middle position, and the telephoto end, respectively.

Figure 11C:
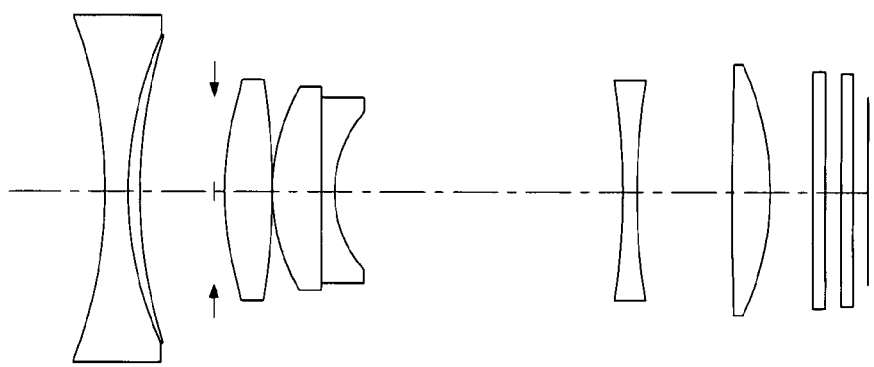

In FIG. 11, I is an imaging surface of CCD which is an electronic imaging element, S is an aperture stop, FL is a filter having a form like parallel plate, and CG is a CCD cover glass having a form like plane plate. The zoom optical system of the embodiment 6 is constituted by having a lens group, a filter FL, a cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D.

The first lens group G1 consists of a cemented lens in which a double concave lens L11 and a positive meniscus lens L12 having a convex surface directed toward the object side are cemented, and it is constituted with one negative lens component as a whole. The positive meniscus lens L12 having convex surface directed toward the object side is a lens in which the an energy hardening type resin is used, and it is formed on the double concave lens L11. The second lens group G2 consists of a double convex lens L21, and a cemented lens in which a double convex lens L22 and a double concave lens L23. The third lens group G3 consists of a double concave lens L31. The fourth lens group G4 consists of a double convex lens L41.

When magnification from a wide angle end to a telephoto end is carried out, the first lens group G1 moves to two directions along the optical axis, namely, it moves toward an image side at first, and then it moves toward an object side along the optical axis, and the second lens group G2 and an aperture stop S move together simply along the optical axis toward the object side so that a distance to the first lens group G1 may be narrowed. The third lens group G3 moves toward the image side at first, so as to narrow a distance to the lens group G4, and then it moves toward the object side along the optical axis, and the fourth lens group G4 moves simply toward the image side along the optical axis.

Next, numerical data of the zoom optical system of the embodiment 6 are shown below.

| Numerical data 6 | | | |
|---|---|---|---|
| $r_1 = -14.0769$ (AP) | $d_1 = 0.8000$ | $n_{d1} = 1.49700$ | $\nu_{d1} = 81.54$ |
| $r_2 = 13.0399$ | $d_2 = 0.4353$ | $n_{d2} = 1.63494$ | $\nu_{d2} = 23.22$ |
| $r_3 = 20.2304$ (AP) | $d_3 = D3$ | | |
| $r_4 = \infty$ (As) | $d_4 = 0.3000$ | | |
| $r_5 = 8.3137$ (AP) | $d_5 = 1.8433$ | $n_{d5} = 1.83481$ | $\nu_{d5} = 42.71$ |
| $r_6 = -28.3034$ (AP) | $d_6 = 0.0791$ | | |
| $r_7 = 7.2890$ (AP) | $d_7 = 1.7325$ | $n_{d7} = 1.83481$ | $\nu_{d7} = 42.71$ |
| $r_8 = -234.9510$ | $d_8 = 0.4000$ | $n_{d8} = 1.80810$ | $\nu_{d8} = 22.76$ |
| $r_9 = 3.9450$ | $d_9 = D9$ | | |
| $r_{10} = -66.2077$ (AP) | $d_{10} = 0.5000$ | $n_{d10} = 1.52542$ | $\nu_{d10} = 55.78$ |
| $r_{11} = 15.5000$ | $d_{11} = D11$ | | |
| $r_{12} = 48.9767$ (AP) | $d_{12} = 1.3800$ | $n_{d12} = 1.83481$ | $\nu_{d12} = 42.71$ |
| $r_{13} = -9.8000$ | $d_{13} = D13$ | | |
| $r_{14} = \infty$ | $d_{14} = 0.5000$ | $n_{d14} = 1.54771$ | $\nu_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $\nu_{d16} = 64.14$ |
| $r_{17} = \infty$ | $d_{17} = D17$ | | |
| $r_{18} = \infty$ (IM) | | | |

| Aspherical coefficient | | | |
|---|---|---|---|
| Surface number 1 | | | |
| $k = -1.7279$ | | | |
| $A_2 = 0$ | $A_4 = 0$ | $A_6 = 5.2480 \times 10^{-6}$ | $A_8 = -6.5711 \times 10^{-8}$ |
| $A_{10} = 0$ | | | |
| Surface number 3 | | | |
| $k = -3.2269$ | | | |
| $A_2 = 0$ | $A_4 = -1.3187 \times 10^{-5}$ | $A_6 = 6.6781 \times 10^{-6}$ | $A_8 = -5.4466 \times 10^{-8}$ |
| $A_{10} = 0$ | | | |
| Surface number 5 | | | |
| $k = -1.8346$ | | | |
| $A_2 = 0$ | $A_4 = -3.1046 \times 10^{-4}$ | $A_6 = -2.2024 \times 10^{-5}$ | $A_8 = -1.4954 \times 10^{-7}$ |
| $A_{10} = 0$ | | | |
| Surface number 6 | | | |
| $k = -5.2682$ | | | |
| $A_2 = 0$ | $A_4 = -3.7806 \times 10^{-4}$ | $A_6 = -3.7399 \times 10^{-6}$ | $A_8 = -2.7381 \times 10^{-7}$ |
| $A_{10} = 0$ | | | |
| Surface number 7 | | | |
| $k = 0.1385$ | | | |
| $A_2 = 0$ | $A_4 = 6.1956 \times 10^{-5}$ | $A_6 = 1.9211 \times 10^{-5}$ | $A_8 = 7.5338 \times 10^{-7}$ |
| $A_{10} = 0$ | | | |
| Surface number 10 | | | |
| $k = 0$ | | | |
| $A_2 = 0$ | $A_4 = -5.4575 \times 10^{-4}$ | $A_6 = 1.3347 \times 10^{-5}$ | $A_8 = 0$ |
| $A_{10} = 0$ | | | |
| Surface number 12 | | | |
| $k = 0$ | | | |
| $A_2 = 0$ | $A_4 = -2.7359 \times 10^{-4}$ | $A_6 = 0$ | $A_8 = 0$ |
| $A_{10} = 0$ | | | |

-continued

Numerical data 6

Refractive index of component of the negative lens $L_{AN}$ according to wavelength nd = 1.496999   nC = 1.495136   nF = 1.501231   ng = 1.504506   nh = 1.507205

Refractive index of component of the positive lens $L_{AP}$ according to wavelength nd = 1.634940   nC = 1.627290   nF = 1.654640   ng = 1.672908   nh = 1.689873

Zoom data(D0 (distance from an object to the first surface) is infinity)

|     | wide angle end | middle position | telephoto end |
| --- | --- | --- | --- |
| F   | 6.42001  | 11.01031 | 18.48963 |
| fno | 1.8421   | 2.4257   | 3.3791   |
| D0  | ∞        | ∞        | ∞        |
| D3  | 14.83968 | 7.18523  | 2.75812  |
| D9  | 1.89368  | 6.35451  | 10.50890 |
| D11 | 2.48563  | 2.12545  | 3.45724  |
| D13 | 3.31078  | 2.34496  | 1.59995  |
| D17 | 0.50015  | 0.50001  | 0.49931  |

Embodiment 7

Figure 13A:
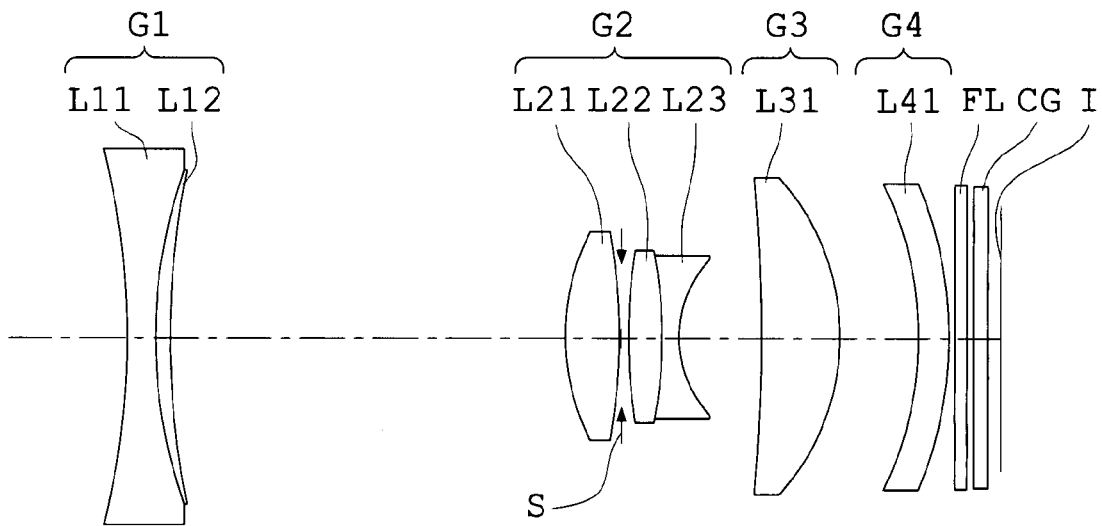
FIGS. 13A, 13B and 13C are sectional views showing an optical arrangement developed along an optical axis at a wide angle end, a middle position and a telephoto end respectively of the zoom lens system when focusing is carried out at the infinite object point in an embodiment 7 according to the present invention.
Figure 13B:
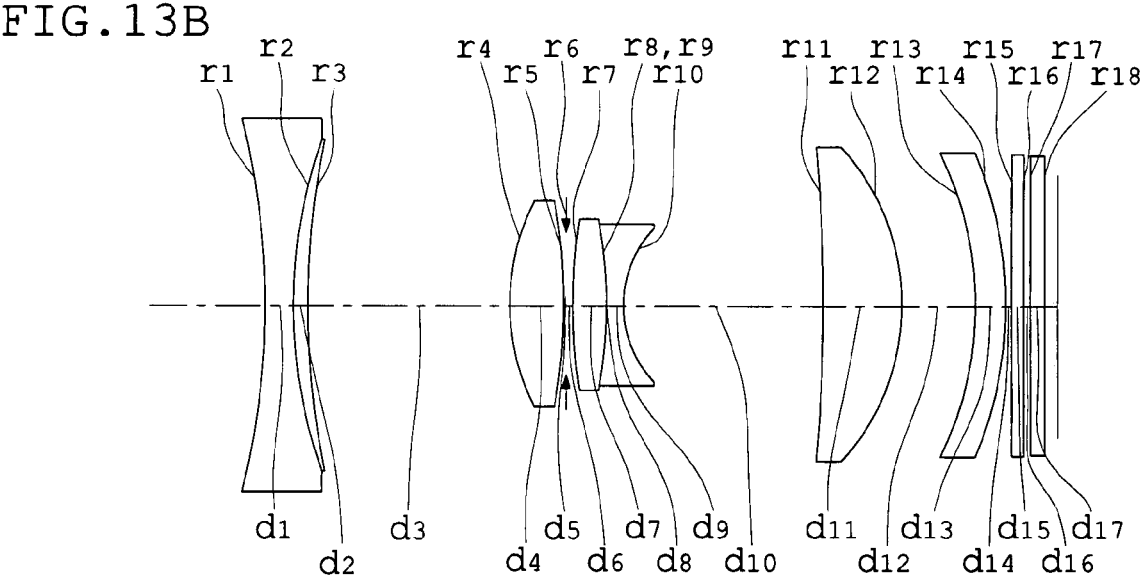
Figure 13C:
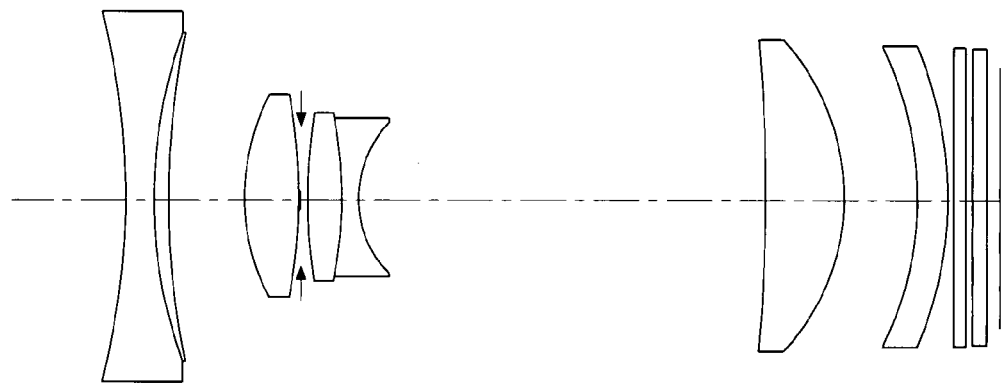

FIGS. 13A, 13B and 13C are sectional views showing an optical arrangement developed along an optical axis at a wide angle end, a middle position and a telephoto end respectively of the zoom lens system when focusing is carried out at the infinite object point in an embodiment 7 according to the present invention. FIGS. 14A~2D, 14E~14H, and 14I~14L are figures showing spherical aberration, astigmatism, distortion, and chromatic aberration of magnification respectively, when focusing is carried out at the infinite object point of the zoom optical system of FIG. 13, and show states in the wide angle end, the middle position, and the telephoto end, respectively.

In FIG. 13, I is an imaging surface of CCD which is an electronic imaging element, S is an aperture stop, FL is a filter having a form like parallel plate, and CG is a CCD cover glass having a form like plane plate.

The zoom optical system of the embodiment 7 is constituted by having a lens group, a filter FL, a cover glass CG and CCD. The zoom optical system comprises, in order from an object side, a first lens group G1 as lens group A, an aperture stop S, a second lens group G2 as lens group B, a third lens group G3 as lens group C, and a fourth lens group G4 as lens group D. The aperture stop S is arranged in the second lens group G2.

The first lens group G1 consists of a cemented lens in which a double concave lens L11 and a positive meniscus lens L12 having a convex surface directed toward the object side are cemented, and it is constituted with one negative lens component as a whole. The positive meniscus lens L12 having convex surface directed toward the object side is a lens in which an energy hardening type resin is used, and it is formed on the double concave lens L11. The second lens group G2 consists of a double convex lens L21, and a cemented lens in which a double convex lens L22 and a double concave lens L23. The aperture stop S is arranged between the double convex lens L21 and the cemented lens. The third group G3 consists of a positive meniscus lens L31 having a convex surface directed toward the image side. The fourth group G4 consists of a positive meniscus lens L41 having a convex surface directed toward the image side.

When magnification from a wide angle end to a telephoto end is carried out, the first lens group G1 moves to two directions along the optical axis, namely, it moves at first toward the image side, and then it moves toward the object side along the optical axis, and the second lens group G2 and an aperture stop S move together simply along the optical axis toward the object side so that a distance to the first lens group G1 may be narrowed. The third lens group G3 moves toward an image side at first so as to narrow a distance to the lens group G4, and then it moves toward the object side along the optical axis, and the fourth lens group does not move. Next, numerical data of optical components of the zoom optical system of the embodiment 7 are shown below.

Numerical data 7

| | | | |
| --- | --- | --- | --- |
| $r_1 = -13.763$ (AP) | $d_1 = 0.900$ | $n_{d1} = 1.58313$ | $v_{d1} = 59.38$ |
| $r_2 = 12.899$ (AP) | $d_2 = 0.411$ | $n_{d2} = 1.63494$ | $v_{d2} = 23.22$ |
| $r_3 = 26.212$ (AP) | $d_3 = D3$ | | |
| $r_4 = 4.842$ (AP) | $d_4 = 1.769$ | $n_{d4} = 1.80139$ | $v_{d4} = 45.46$ |
| $r_5 = -17.622$ (AP) | $d_5 = 0.100$ | | |
| $r_6 = \infty$ (AS) | $d_6 = 0.200$ | | |
| $r_7 = 13.790$ | $d_7 = 1.130$ | $n_{d7} = 1.80100$ | $v_{d7} = 34.97$ |
| $r_8 = -11.621$ | $d_8 = 0.007$ | $n_{d8} = 1.56384$ | $v_{d8} = 60.67$ |
| $r_9 = -11.621$ | $d_9 = 0.500$ | $n_{d9} = 1.80518$ | $v_{d9} = 25.42$ |
| $r_{10} = 3.138$ | $d_{10} = D10$ | | |
| $r_{11} = -37.451$ | $d_{11} = 2.390$ | $n_{d11} = 1.52542$ | $v_{d11} = 55.78$ |
| $r_{12} = -5.671$ (AP) | $d_{12} = D12$ | | |

-continued

Numerical data 7

| | | |
|---|---|---|
| $r_{13} = -11.611$ (AP) | $d_{13} = 1.000$ | $n_{d13} = 1.52542$ $\nu_{d13} = 55.78$ |
| $r_{14} = -10.000$ | $d_{14} = 0.130$ | |
| $r_{15} = \infty$ | $d_{15} = 0.400$ | $n_{d15} = 1.54771$ $\nu_{d15} = 62.84$ |
| $r_{16} = \infty$ | $d_{16} = 0.200$ | |
| $r_{17} = \infty$ | $d_{17} = 0.500$ | $n_{d17} = 1.51633$ $\nu_{d17} = 64.14$ |
| $r_{18} = \infty$ | | |

Aspherical coefficient

Surface number 1

$k = -11.8073$
$A_4 = -4.3618 \times 10^{-4}$  $A_6 = 3.8856 \times 10^{-5}$  $A_8 = -1.3045 \times 10^{-6}$  $A_{10} = 1.5738 \times 10^{-8}$
$A_{12} = 0$  $A_{14} = 0$  $A_{16} = 0$  $A_{18} = 0$  $A_{20} = 0$ Surface number 2

$k = -68.5453$
$A_4 = 1.2061 \times 10^{-3}$  $A_6 = -2.3931 \times 10^{-5}$  $A_8 = 2.6541 \times 10^{-7}$  $A_{10} = 0$
$A_{12} = 0$  $A_{14} = 0$  $A_{16} = 0$  $A_{18} = 0$  $A_{20} = 0$ Surface number 3

$k = -77.8212$
$A_4 = 2.0577 \times 10^{-4}$  $A_6 = 3.6533 \times 10^{-5}$  $A_8 = -1.6516 \times 10^{-6}$  $A_{10} = 2.1313 \times 10^{-8}$
$A_{12} = 0$  $A_{14} = 0$  $A_{16} = 0$  $A_{18} = 0$  $A_{20} = 0$ Surface number 4

$k = -2.5494$
$A_4 = 1.8620 \times 10^{-3}$  $A_6 = -9.3264 \times 10^{-5}$  $A_8 = -3.0629 \times 10^{-6}$  $A_{10} = 0$
$A_{12} = 0$  $A_{14} = 0$  $A_{16} = 0$  $A_{18} = 0$  $A_{20} = 0$ Surface number 5

$k = -4.6926$
$A_4 = 8.2896 \times 10^{-4}$  $A_6 = -1.6537 \times 10^{-4}$  $A_8 = 5.9244 \times 10^{-6}$  $A_{10} = 0$
$A_{12} = 0$  $A_{14} = 0$  $A_{16} = 0$  $A_{18} = 0$  $A_{20} = 0$ Surface number 12

$k = -1.6436$
$A_4 = -4.5607 \times 10^{-4}$  $A_6 = 1.3950 \times 10^{-6}$  $A_8 = 2.7378 \times 10^{-7}$  $A_{10} = -5.7200 \times 10^{-9}$
$A_{12} = 0$  $A_{14} = 0$  $A_{16} = 0$  $A_{18} = 0$  $A_{20} = 0$ Surface number 13

$k = -0.9892$
$A_4 = -2.1476 \times 10^{-3}$  $A_6 = 6.9184 \times 10^{-5}$  $A_8 = -1.2423 \times 10^{-7}$  $A_{10} = 0$
$A_{12} = 0$  $A_{14} = 0$  $A_{16} = 0$  $A_{18} = 0$  $A_{20} = 0$ Refractive index of component of the negative lens $L_{AN}$ according to wavelength $nd = 1.583126$   $nC = 1.580139$   $nF = 1.589960$   $ng = 1.595296$   $nh = 1.599721$ Refractive index of component of the positive lens $L_{AP}$ according to wavelength $nd = 1.634940$   $nC = 1.627290$   $nF = 1.654640$   $ng = 1.672908$   $nh = 1.689875$ Zoom data (D0 (distance from an object to the first surface) is infinity)

| | wide angle end | middle position | telephoto end |
|---|---|---|---|
| F | 6.320 | 10.491 | 18.202 |
| Fno | 2.601 | 3.440 | 4.944 |
| D3 | 12.667 | 6.493 | 2.330 |
| D10 | 2.624 | 6.366 | 12.953 |
| D12 | 2.542 | 2.437 | 2.550 |

Next, parameter values corresponding to each of the embodiments mentioned above according to the present invention are shown in the following table 1.

TABLE 1

|  | Embodiment 1 | Embodiment 2 | Embodiment 3 | Embodiment 4 | Embodiment 5 | Embodiment 6 | Embodiment 7 |
| --- | --- | --- | --- | --- | --- | --- | --- |
| fw | 6.42002 | 6.41984 | 6.41996 | 6.42000 | 6.42000 | 6.42001 | 6.320 |
| y10 | 3.6 | 3.6 | 3.6 | 3.6 | 3.6 | 3.6 | 3.84 |
| Ndp | 23.22 | 15.00 | 15.00 | 23.22 | 23.22 | 23.22 | 23.22 |
| $\theta gFp$ | 0.7001 | 0.7800 | 0.7122 | 0.6679 | 0.6679 | 0.6679 | 0.6679 |
| $\theta hgp$ | 0.6765 | 0.8160 | 0.6976 | 0.6203 | 0.6203 | 0.6203 | 0.6203 |
| ndp | 1.63494 | 1.70999 | 1.75000 | 1.63494 | 1.63494 | 1.63494 | 1.63494 |
| Bp | 0.7379 | 0.8045 | 0.7367 | 0.7057 | 0.7057 | 0.7057 | 0.7057 |
| Bhgp | 0.7287 | 0.8498 | 0.7314 | 0.6725 | 0.6725 | 0.6725 | 0.6725 |
| $z_{AF}(4.494)$ | −0.70327 | −0.56446 | −0.37389 | −0.69299 | −0.70637 | −0.67222 | −0.61679 |
| $z_{AC}(4.494)$ | 0.78934 | 0.76173 | 1.33221 | 0.77798 | 1.01666 | 0.79887 | 0.72719 |
| $z_{AR}(4.494)$ | 0.51930 | 0.53794 | 0.71270 | 0.45251 | 0.50704 | 0.52671 | 0.45639 |
| $|z_{AR}(h) - z_{AC}(h)|/tp$ at h = 4.494 | 0.6373 | 0.6367 | 0.9047 | 0.6815 | 0.7247 | 0.6252 | 0.65872 |
| tp/tn | 0.5296 | 0.4394 | 0.8560 | 0.5970 | 0.8790 | 0.5441 | 0.4567 |
| $k_{AF}$ | −2.8817 | −10.2252 | 0.6227 | −6.4093 | −3.9537 | −1.7279 | −11.8073 |
| $k_{AR}$ | −2.9323 | 3.8529 | −0.5547 | −2.4919 | −0.9087 | −3.2269 | −77.8212 |
| $z_{AF}(h)/z_{AR}(h)$ at h = 4.494 | −1.3543 | −1.0493 | −0.5246 | −1.5314 | −1.3931 | −1.2763 | −1.35145 |
| $y_{07}$ | 2.52 | 2.52 | 2.52 | 2.52 | 2.52 | 2.52 | 2.688 |
| $\tan\omega_{07w}$ | 0.41890 | 0.41843 | 0.41853 | 0.41919 | 0.41863 | 0.41984 | 0.43335 |
| $d_{CD}/fw$ | 0.3719 | 0.3653 | 0.4443 | 0.3225 | 0.3764 | 0.3872 | 0.4022 |
| $(R_{CF} + R_{CR})/(R_{CF} - R_{CR})$ | 0.2041 | 0.5509 | 0.4148 | −0.4058 | 0.3670 | 0.6206 | *** |
| $(R_{DF} + R_{DR})/(R_{DF} - R_{DR})$ | 0.7383 | 0.8370 | 0.8298 | 0.6852 | 0.7400 | 0.6665 | *** |
| Ndn | 81.54 | 59.38 | 49.34 | 81.54 | 81.54 | 81.54 | 59.38 |
| $\theta gFn$ | 0.5386 | 0.5438 | 0.5528 | 0.5373 | 0.5373 | 0.5373 | 0.5438 |
| $\theta hgn$ | 0.4417 | 0.4501 | 0.4638 | 0.4428 | 0.4428 | 0.4428 | 0.4501 |
| ndn | 1.49700 | 1.58913 | 1.74320 | 1.49700 | 1.49700 | 1.49700 | 1.58313 |
| $\theta gFp - \theta gFn$ | 0.1615 | 0.2362 | 0.1594 | 0.1306 | 0.1306 | 0.1306 | 0.1241 |
| $\theta hgp - \theta hgn$ | 0.2348 | 0.3659 | 0.2338 | 0.1775 | 0.1775 | 0.1775 | 0.1702 |
| Ndp − vdn | −58.32 | −44.38 | −34.34 | −58.32 | −58.32 | −58.32 | −36.16 |

The optical zoom optical system according to the present invention as mentioned above can be used in a photographing apparatus in which photographing of an objective image carried out by an electronic imaging element (CCD, CMOS), especially a digital camera and a video camera, a personal computer as an example of an information processing apparatus, a telephone, a personal digital assistant, particularly, a cellular phone that is useful for carrying and the like.

A digital camera will be illustrated below as an embodiment.

Figure 15:
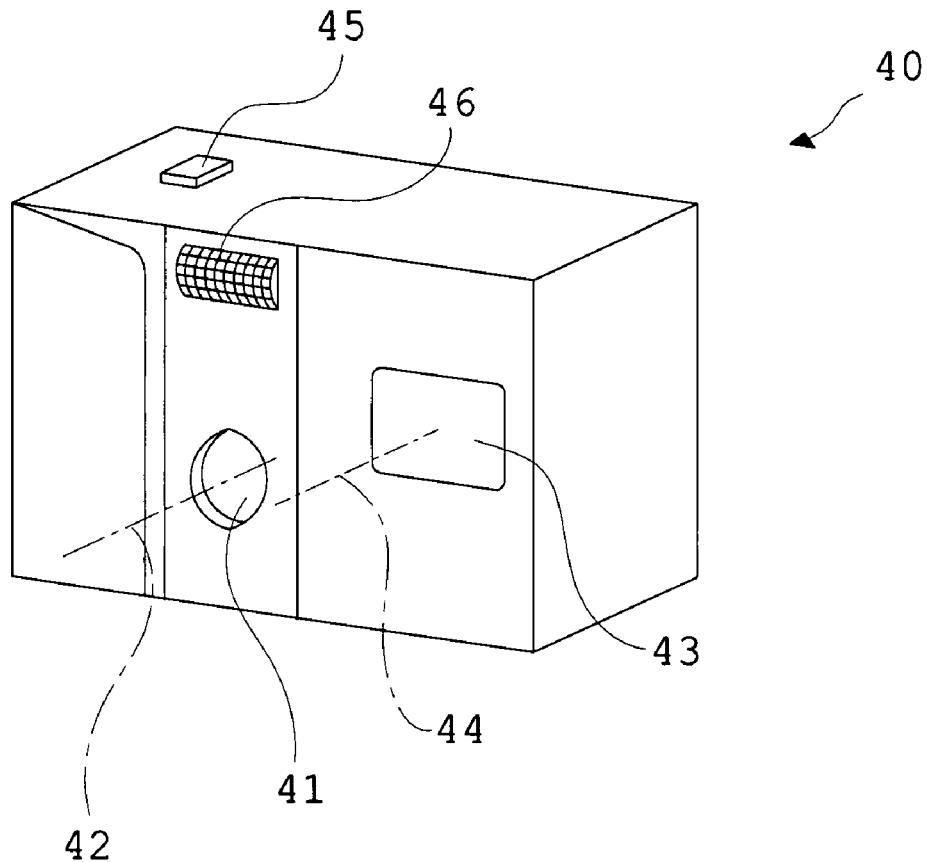
FIG. 15 is a front perspective diagram showing an outside view of a digital camera using the zoom optical system of the present invention.
Figure 16:
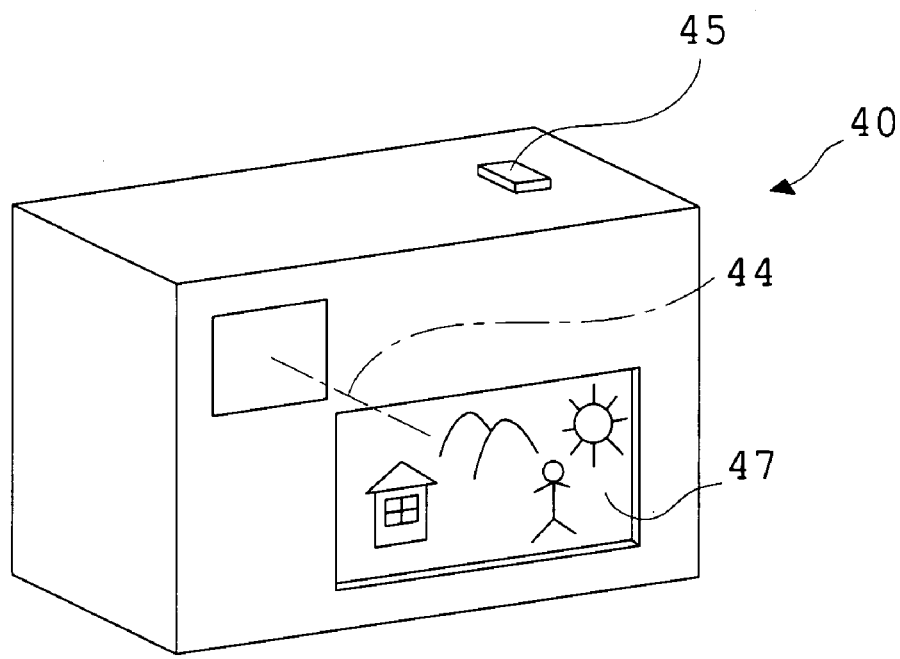
FIG. 16 is a back perspective diagram of the digital camera of FIG. 15.
Figure 17:
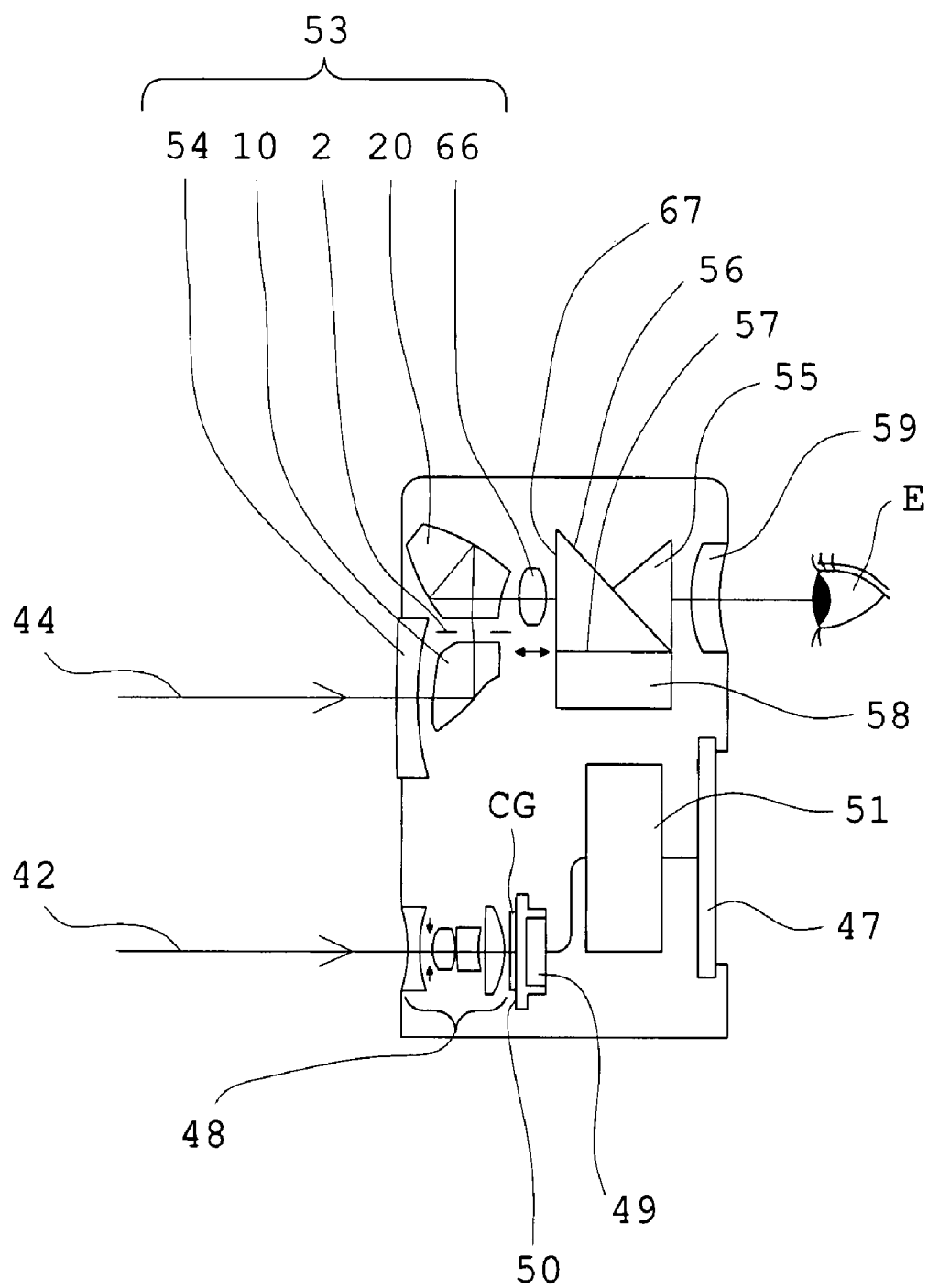
FIG. 17 is a sectional view showing an optical composition of the digital camera of FIG. 16.

FIGS. 15~17 are conceptual diagrams of composition in which an image forming optical system of the present invention is incorporated in the photographing optical system 41 of the digital camera. FIG. 15 is a front perspective diagram showing the outside view of the digital camera 40, FIG. 16 is a back perspective diagram of the same, and FIG. 17 is a sectional view showing an optical composition of the digital camera 40.

In the case of this example, the digital camera 40 comprises the photographical optical system 41 which has a light path 42 for photographing, a finder optical system 43 which has the light path for finder 44, a shutter 45, a flash 46, and a liquid crystal display monitor 47 and the like. When a photographing person presses a shutter 45 arranged in an upper part of the camera 40, by interlocking with such action, photographing is carried out through the photographical optical system 41, for example, the zoom optical system of the embodiment 1.

An object image formed by the photographical optical system 41 is formed on an imaging surface of CCD 49. The object image received by the CCD 49 is displayed as an electronic image on the liquid crystal display monitor 47 provided on the backside of the camera through an image processing means 51. A memory means or the like is arranged in the image processing means 51, and a photographed electronic image can be recorded also. The memory means may be provided independently from the image processing means 51, or may be constructed so that the image is electronically recorded and written by a floppy disk (registered trade mark), a memory card, MO, etc.

Furthermore, an objective optical system for finder 53 is arranged on the finder optical path 44. This objective optical system for finder 53 consists of a cover lens 54, a first prism 10, an aperture stop S, a second prism 20, a lens for focusing 66.

An object image is formed on the imaging surface 67 by this objective optical system for finder 53. This object image is formed on a view frame 57 of a Polo prism 55 which is an image erecting component. Behind the Porro prism 55, an eye piece optical system 59 which introduces an erected image into an observer's eye E is arranged.

According to the digital camera 40 constituted in this way, an electronic imaging apparatus having a miniaturized and thin zoom lens in which as the number of lenses of the photographical optical system 41 is reduced can be realized.

The present invention is suitable for fields of a zoom optical system which is good for an electronic imaging optical system where thinning of shape, high image forming performance, and large aperture ratio are required to be satisfied simultaneously in order to enable to take a photograph finely, also even in an environment with a little light, and an electronic imaging apparatus having the zoom optical system.

What is claimed is:

1. A zoom optical system comprising;
a lens group A having one negative lens component at the most object side, and a lens group B arranged adjacent to the lens group A, where a distance on the optical axis between the lens group A and the lens group B is changed for magnification purpose,
wherein
the negative lens component is a cemented lens consisting of a positive lens $L_{AP}$ and a negative lens $L_{AN}$, and
when in a rectangular coordinate system in which a horizontal axis is expressed by vdp and an vertical axis is expressed by θgFp, a straight line expressed by θgFp=αp×vdp+βp (αp=−0.00163) is set up, v dp and θgFp of the positive lens $L_{AP}$ are included in both of a domain which is specified by a straight line at a lower limit of the following condition (1) and a straight line at an upper limit of the following condition (1), and a domain which is specified by the following condition (2)

$$0.6400 < \beta p < 0.9000 \quad (1)$$

$$3 < \nu\, dp < 27 \quad (2)$$

here, θ gFp is a ratio of a partial dispersion (ng−nF)/(nF−nC) of the positive lens $L_{AP}$; v d p is Abbe number (nd−1)/(nF−nC) of the positive lens $L_{AP}$; nd is refractive index to d line; nC is refractive index to C line; nF is refractive index to F line; and ng is refractive index to g line.

2. The zoom optical system of the claim 1,
wherein
when in another rectangular coordinate system in which a horizontal axis is expressed by vdp and an vertical axis is expressed by θhgp, a straight line expressed by θhgp=αhgp×vdp+βhgp (here, αhgp=−0.00225) is set up, v dp and θhgp of the positive lens $L_{AP}$ are included in both of a domain which is specified by a straight line at a lower limit of the following condition (3), and a straight line at an upper limit of the condition (3), and a domain which is specified by the following condition (2)

$$0.5700 < \beta hgp < 0.9500 \quad (3)$$

$$3 < vdp < 27 \quad (2)$$

here, θ hgp is a ratio of a partial dispersion (nh−ng)/(nF−nC) of the positive lens $L_{AP}$; vdp is Abbe number (nd−1)/(nF−nC) of the positive lens $L_{AP}$; nd is refractive index to d line; nC is refractive index to C line; nF is refractive index to F line; ng is refractive index to g line: and nh is refractive index to h line.

3. The zoom optical system of the claim 1 or 2 satisfying the following condition (4), $$0.08 \leq \theta\, gFp - \theta\, gFn \leq 0.50 \quad (4)$$

here, θ gFp is a ratio of a partial dispersion (ng−nF)/(nF−nC) of the positive lens $L_{AP}$; θ gFn is a ratio of a partial dispersion (ng−nF)/(nF−nC) of the negative lens $L_{AN}$; nC is refractive index to C line; nF is refractive index to F line; and ng is refractive index to g line.

4. The zoom optical system of the claim 3 satisfying the following condition (5), $$0.090 \leq \theta\, hgp - \theta\, hgn \leq 0.60 \quad (5)$$

here, θ hgp is a ratio of a partial dispersion (nh−ng)/(nF−nC) of the positive lens $L_{AP}$; θ hgn is a ratio of a partial dispersion (nh−ng)/(nF−nC) of the negative lens $L_{AN}$; nC is refractive index to C line; nF is refractive index to F line; ng is refractive index to g line; and nh is refractive index to h line.

5. The zoom optical system of the claim 1, 2, or 4 satisfying the following condition (6), $$\nu\, dp - \nu\, dn \leq -30 \quad (6)$$

here, v dp is Abbe number (nd−1)/(nF−nC) of the positive lens $L_{AP}$; v dn is Abbe number (nd−1)/(nF−nC) of the negative lens $L_{AN}$; nd is refractive index to d line; nC is refractive index to C line; and nF is refractive index to F line.

6. The zoom optical system of the claim 1, wherein refractive index ndp to d line of the positive lens $L_{AP}$ satisfies the following condition (7);

$$1.50 \leq ndp \leq 1.85 \quad (7).$$

7. The zoom optical system of the claims 1, wherein the positive lens $L_{AP}$ is a lens using energy hardening type resin, which is formed directly on the negative lens $L_{AN}$.

8. The zoom optical system of the claims 1, wherein the cemented lens is constituted such that the negative lens $L_{AN}$ and the positive lens $L_{AP}$ are cemented in order from an object side.

9. The zoom optical system of the claim 1 satisfying the following condition (9), when an aspherical surface is expressed by the following formula (8), where a direction of an optical axis is z; a direction which intersects perpendicularly to the optical axis is h; a cone coefficient is k; an aspherical coefficient is represented by $A_4$, $A_6$, $A_8$, and $A_{10}$; and a radius of curvature of spherical surface component on the optical axis is R, $$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (8)$$

here, $z_{AC}$ is a form of the surface at a cemented side in the positive lens $L_{AP}$; $z_{AR}$ is a form of the surface at an air contact side in the positive lens $L_{AP}$, all of which are forms according to the condition (8); h is expressed by h=0.7 fw when the focal length of the whole zoom optical system at the wide angle end is set to fw; tp is a thickness on the optical axis of the positive lens $L_{AP}$; and z(0)=0 always.

10. The zoom optical system of the claim 1 satisfying the following conditions (11)~(13),
when an aspherical surface is expressed by the following formula (8) where a direction of an optical axis is z; a direction which intersects perpendicularly to the optical axis is h; a cone coefficient is k; an aspherical coefficient is represented by $A_4$, $A_6$, $A_8$, and $A_{10}$; and a radius of curvature of spherical surface component on the optical axis is R, $$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (8)$$

here, $k_{AF}$ is k value concerning a surface at the most object side in the lens group A, $k_{AR}$ is k value concerning a surface at the most image side in the lens group A, all of which are k values in the condition (8), $z_{AF}$ is k value concerning a surface at the most object side in the lens group A, and $k_{AR}$ is k value concerning a surface at the most image side in the lens group A, and h is expressed by h=0.7 fw, when the focal length of the whole zoom optical system at the wide angle end is set to fw.

11. The zoom optical system of the claim 1 wherein a cemented surface of the cemented lens is an aspherical surface.

12. The zoom optical system of the claim 11 wherein the aspherical surface of the cemented surface of the cemented lens has stronger convergence than that of spherical surface as it is departed from an optical axis.

13. The zoom optical system of the claim 11 or 12 wherein the difference of refraction index in d line of the positive lens $L_{AP}$ and the negative lens $L_{AN}$ is 0.2 or less.

14. The zoom optical system of the claim 1 wherein the lens group A moves firstly toward an image side, and then it moves forward direction or backward direction along the optical axis when magnification from a wide angle end to a telephoto end.

15. The zoom optical system of the claim 1 wherein the lens group B is constituted with two lens components, or a single lens component and a cemented lens component, or three lenses.

16. The zoom optical system of the claim 1 wherein a negative lens group C and a positive lens group D in which a mutual distance is variable are arranged at the image side of the lens group B.

17. Zoom optical system of the claim 16 where the lens group C consists of a negative lens only, and the lens group D consists of a positive lens only.

18. The zoom optical system of the claim 1 wherein a positive lens group C and a lens group D consisting of a meniscus lens having a convex surface directed toward the image side in which a mutual distance is variable are arranged at the image side of the lens group B.

19. The zoom optical system of the claim 18 wherein the lens group C consists of a positive lens only.

20. An imaging apparatus provided with the zoom optical system according to the claim 1, and an image processing unit having an electronic imaging element arranged near an image forming position of the zoom optical system, wherein an image formed through the zoom optical system is photographed by the electronic imaging element, and an image data photographed by the electronic imaging element is processed electrically, and the image data can be outputted as an image data such that a shape of the image data was changed, and the following condition (19) is satisfied when focusing is carried out at nearly infinite object point, $$0.7 < y_{07}/(fw \cdot \tan \omega_{07w}) < 0.94 \quad (19)$$

here, $y_{07}$ is expressed by $y_{07} = 0.7 y_{10}$ when a distance to the most distant point from a center (maximum image height) within an effective imaging surface of the electronic imaging element (within the surface in which photographing can be performed) is set to $y_{10}$; $\omega_{07w}$ is an angle to the optical axis of the direction of an object point corresponding to an image point connected to the position of $y_{07}$ from the center on the imaging surface at a wide angle end; and fw is a focal length of the whole zoom optical system at the wide angle end.

* * * * *

UNITED STATES PATENT AND TRADEMARK OFFICE
CERTIFICATE OF CORRECTION

PATENT NO. : 7,522,347 B2
APPLICATION NO. : 11/717813
DATED : April 21, 2009
INVENTOR(S) : Keisuke Ichikawa et al.

Page 1 of 1

It is certified that error appears in the above-identified patent and that said Letters Patent is hereby corrected as shown below:

Column 40, line 35, please insert the following after formula (8):

-- $0.1 \leq |Z_{ar}(h) - Z_{AC}(h)|/tp \leq 0.96...$         (9) --

Column 40, line 57, please insert the following after formula (8):

-- $-50 \leq k_{AF} \leq 10...$         (11)

$-150 \leq k_{AR} \leq 20...$         (12)

$-8 \leq Z_{AF}(h)/Z_{ar}(h) \leq 2...$         (13) --

Signed and Sealed this

Sixth Day of October, 2009

David J. Kappos
*Director of the United States Patent and Trademark Office*